US009164908B2

(12) United States Patent
Dinkjian et al.

(10) Patent No.: US 9,164,908 B2
(45) Date of Patent: *Oct. 20, 2015

(54) MANAGING OUT-OF-ORDER MEMORY COMMAND EXECUTION FROM MULTIPLE QUEUES WHILE MAINTAINING DATA COHERENCY

(71) Applicant: INTERNATIONAL BUSINESS MACHINES CORPORATION, Armonk, NY (US)

(72) Inventors: Robert M. Dinkjian, Round Rock, TX (US); Robert S. Horton, Colchester, VT (US); Michael Y. Lee, Atkinson, NH (US); Bill N. On, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/680,182

(22) Filed: Apr. 7, 2015

(65) Prior Publication Data

US 2015/0212941 A1 Jul. 30, 2015

Related U.S. Application Data

(63) Continuation of application No. 14/039,301, filed on Sep. 27, 2013, now Pat. No. 9,026,763, which is a continuation of application No. 13/757,397, filed on Feb. 1, 2013, now Pat. No. 9,021,228.

(51) Int. Cl.
*G06F 12/00* (2006.01)
*G06F 12/08* (2006.01)
*G06F 12/12* (2006.01)

(52) U.S. Cl.
CPC ........ *G06F 12/0831* (2013.01); *G06F 12/0877* (2013.01); *G06F 12/128* (2013.01); *G06F 2212/603* (2013.01); *G06F 2212/621* (2013.01); *G06F 2212/69* (2013.01)

(58) Field of Classification Search
USPC .......................................................... 711/168
See application file for complete search history.

(56) References Cited

U.S. PATENT DOCUMENTS 5,062,081 A 10/1991 Runaldue
5,666,506 A 9/1997 Hesson et al.
(Continued)

FOREIGN PATENT DOCUMENTS

EP 0518420 A2 12/1992
WO 96/30838 A1 10/1996

OTHER PUBLICATIONS

Jaleel et al, "The Effects of Out-of-Order Execution on the Memory System", accessed from the Internet on Nov. 3, 2012, from http://www.jaleels.org/ajaleel/publications/ajaleel-PhD-proposal.pdf, 39 pages.

(Continued)

*Primary Examiner* — Jared Rutz
*Assistant Examiner* — Hamdy S Ahmed
(74) *Attorney, Agent, or Firm* — Parashos T. Kalaitzis; Amy J. Pattillo

(57) ABSTRACT

Responsive to selecting a particular queue from among at least two queues to place an incoming event into within a particular entry from among multiple entries ordered upon arrival of the particular queue each comprising a separate collision vector, a memory address for the incoming event is compared with each queued memory address for each queued event in the other entries in the at least one other queue. Responsive to the memory address for the incoming event matching at least one particular queued memory address for at least one particular queued event in the at least one other queue, at least one particular bit is set in a particular collision vector for the particular entry in at least one bit position from among the bits corresponding with at least one row entry position of the at least one particular queued memory address within the other entries.

14 Claims, 16 Drawing Sheets

(56) References Cited

U.S. PATENT DOCUMENTS

| | | | |
|---|---|---|---|
| 6,038,646 | A | 3/2000 | Sproull |
| 6,237,066 | B1 | 5/2001 | Pan et al. |
| 6,256,713 | B1 | 7/2001 | Audityan et al. |
| 6,629,218 | B2 | 9/2003 | Cho |
| 6,711,654 | B2 | 3/2004 | Rangan |
| 6,877,077 | B2 | 4/2005 | McGee et al. |
| 6,886,048 | B2 | 4/2005 | Richard et al. |
| 6,957,311 | B2 | 10/2005 | Kanamaru et al. |
| 6,965,987 | B2 | 11/2005 | Senter Brashears et al. |
| 7,243,194 | B2 | 7/2007 | Daly, Jr. et al. |
| 7,281,110 | B1 | 10/2007 | Cismas |
| 8,082,396 | B2 | 12/2011 | Blackmon et al. |
| 8,521,982 | B2 * | 8/2013 | Cargnoni et al. ............ 711/169 |
| 2007/0101106 | A1 | 5/2007 | Senter et al. |
| 2014/0223111 | A1 | 8/2014 | Dinkjian et al. |
| 2014/0223115 | A1 | 8/2014 | Dinkjian et al. |

OTHER PUBLICATIONS

Cache Coherence, accessed from the Internet on Nov. 8, 2012 from http://en.wikipedia.org/wiki/Cache_coherence, 3 pages.
Notice of Allowance, mailing date Sep. 27, 2013, U.S. Appl. No. 14/039,301, filed Sep. 27, 2013, In re Dinkjian, 27 pages.
Non-Final Office Action, U.S. Appl. No. 14/039,301, filed Sep. 27, 2013, In re Dinkjian, mailing date Sep. 9, 2014, 24 pages.
Non-Final Office Action, mailing date Aug. 29, 2014, U.S. Appl. No. 13/757,397, filed Feb. 2, 2013, In re Dinkjian, 29 pages.
Notice of Allowance, mailing date Dec. 23, 2014, U.S. Appl. No. 13/757,397, filed Feb. 1, 2013, In re Dinkjian, 27 pages.

* cited by examiner

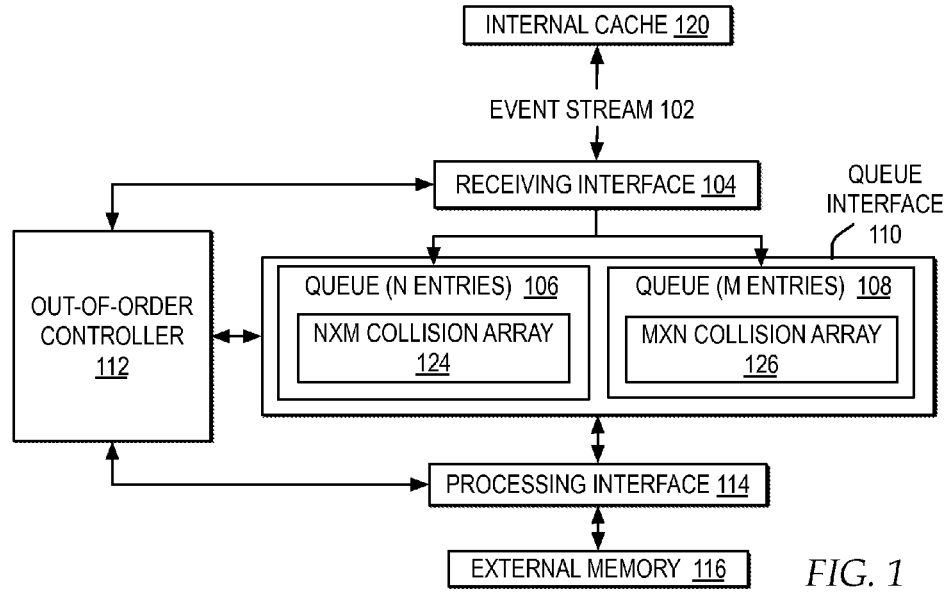
FIG. 1
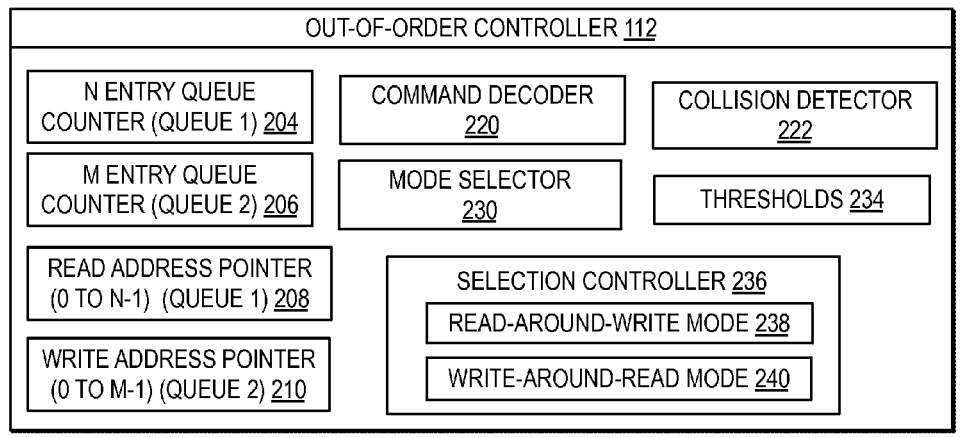
FIG. 2
FIG. 3

INCOMING EVENT STREAM 602
- RECEIVE WRITE ENTRY, ADR A6 -> TO W QUEUE IN ENTRY W3, NO MATCHES IN R QUEUE, ACTIVE
- RECEIVE READ ENTRY, ADR A6 -> TO R QUEUE IN ENTRY R3, MATCHES ENTRY W3 IN W QUEUE, SET BITS TO 00_0100, ACTIVE
- RECEIVE WRITE ENTRY, ADR A6 -> TO W QUEUE IN ENTRY W4, MATCHES ENTRY R3 IN R QUEUE, SET BITS TO 0001_0000, ACTIVE
- RECEIVE READ ENTRY, ADR A7 -> TO R QUEUE IN ENTRY R4, NO MATCHES IN W QUEUE, ACTIVE
- RECEIVE WRITE ENTRY, ADR A7 -> TO W QUEUE IN ENTRY W5, MATCHES ENTRY R4 IN R QUEUE, SET BITS TO 0000_1000, ACTIVE
- RECEIVE READ ENTRY, ADR A6 -> TO R QUEUE IN ENTRY R5, MATCHES ENTRIES W3 AND W4 IN W QUEUE, SET BITS TO 00_0110, ACTIVE
- RECEIVE READ ENTRY, ADR A7 -> TO R QUEUE IN ENTRY R6, MATCHES ENTRY W5, SET BITS TO 00_0001, ACTIVE
- RECEIVE READ ENTRY, ADR A8 -> TO R QUEUE IN ENTRY R7, NO MATCHES IN W QUEUE, ACTIVE

READ QUEUE 604

| ENTRY-ADR | R-C-W ARRAY (NxM) | STATUS |
|---|---|---|
| R0-A1 | 00_0000 | 0=DONE |
| R1-A2 | 00_0000 | 0=DONE |
| R2-A3 | 00_0000 | 0=DONE |
| R3-A6 | 00_0100 | 1 = ACTIVE |
| R4-A7 | 00_0000 | 1 = ACTIVE |
| R5-A6 | 00_0110 | 1 = ACTIVE |
| R6-A7 | 00_0001 | 1 = ACTIVE |
| R7-A8 | 00_0000 | 1 = ACTIVE |

READ ADDRESS POINTER → R3-A6

WRITE QUEUE

| ENTRY-ADR | W-C-R ARRAY (MxN) | STATUS |
|---|---|---|
| W0-A7 | 0000_0000 | 0=DONE |
| W1-A4 | 0000_0000 | 0=DONE |
| W2-A5 | 0000_0000 | 0=DONE |
| W3-A6 | 0000_0000 | 1=ACTIVE |
| W4-A6 | 0001_0000 | 1=ACTIVE |
| W5-A7 | 0000_1000 | 1=ACTIVE |

WRITE ADDRESS POINTER → W3-A6

SELECT NEXT EVENT FROM QUEUE (READ-AROUND-WRITE MODE) 606
- CHECK R3, NEXT READ EVENT - > DETECT OR'D COLLISION BIT OF "1" IN R3
- SELECT W3 AS NEXT ENTRY -> CLEAR COLLISION BITS IN R QUEUE ARRAY FOR BIT "3", SET STATUS OF W3 TO "DONE", INCREMENT WRITE ADDRESS POINTER

608

| | | |
|---|---|---|
| R0-A0 | 00_0000 | 0=DONE |
| R1-A2 | 00_0000 | 0=DONE |
| R2-A3 | 00_0000 | 0=DONE |
| R3-A6 | 00_0000 | 1 = ACTIVE |
| R4-A7 | 00_0000 | 1 = ACTIVE |
| R5-A6 | 00_0010 | 1 = ACTIVE |
| R6-A7 | 00_0001 | 1 = ACTIVE |
| R7-A8 | 00_0000 | 1 = ACTIVE |

READ ADDRESS POINTER → R3-A6

| | | |
|---|---|---|
| W0-A7 | 0000_0000 | 0=DONE |
| W1-A4 | 0000_0000 | 0=DONE |
| W2-A5 | 0000_0000 | 0=DONE |
| W3-A6 | 0000_0000 | 0=DONE |
| W4-A6 | 0001_0000 | 1=ACTIVE |
| W5-A7 | 0000_1000 | 1=ACTIVE |

WRITE ADDRESS POINTER → W4-A6

*FIG. 6A*

SELECT NEXT EVENT FROM QUEUE (MODE: WRITE-AROUND-READ)
- CHECK W1, NEXT WRITE EVENT -> OR'D COLLISION BIT OF "1"
- SELECT R3 AS NEXT ENTRY -> CLEAR COLLISION BITS IN THE WRITE QUEUE ARRAY FOR BIT "3",
SET STATUS OF R3 TO "DONE", INCREMENT READ ADDRESS POINTER     712

| READ QUEUE | ENTRY -ADR | R-C-W ARRAY (NxM) | STATUS |
|---|---|---|---|
| 714 | R0 | 00_0000 | 0=DONE |
| | R1 | 00_0000 | 0=DONE |
| | R2 | 00_0000 | 0=DONE |
| | R3 | 00_0000 | 0=DONE |
| READ → | R4 | 00_0000 | 1 = ACTIVE |
| ADDRESS | R5 | 00_0000 | 1 = ACTIVE |
| POINTER | R6 | 00_0000 | 1 = ACTIVE |
| | R7 | 00_0000 | 1 = ACTIVE |

| WRITE QUEUE | ENTRY - ADR | W-C-R ARRAY (MxN) | STATUS |
|---|---|---|---|
| | W0 | 0000_0000 | 0=DONE |
| WRITE → | W1 | 0000_1000 | 1=ACTIVE |
| ADDRESS | W2 | 0000_0000 | 1=ACTIVE |
| POINTER | W3 | 0000_0000 | 1=ACTIVE |
| | W4 | 0000_0000 | 1=ACTIVE |
| | W5 | 0000_0000 | 1=ACTIVE |

SELECT NEXT EVENT FROM QUEUE  (MODE: WRITE-AROUND-READ)     716
- CHECK W1, NEXT WRITE EVENT -> OR'D COLLISION BIT OF "1"
- SELECT R4 AS NEXT ENTRY -> CLEAR COLLISION BIT IN THE WRITE QUEUE ARRAY FOR BIT "4", SET
STATUS OF R4 TO "DONE", INCREMENT WRITE ADDRESS POINTER

| READ QUEUE | ENTRY -ADR | R-C-W ARRAY (NxM) | STATUS |
|---|---|---|---|
| 718 | R0 | 00_0000 | 0=DONE |
| | R1 | 00_0000 | 0=DONE |
| | R2 | 00_0000 | 0=DONE |
| | R3 | 00_0000 | 0=DONE |
| | R4 | 00_0000 | 0=DONE |
| READ → | R5 | 00_0000 | 1 = ACTIVE |
| ADDRESS | R6 | 00_0000 | 1 = ACTIVE |
| POINTER | R7 | 00_0000 | 1 = ACTIVE |

| WRITE QUEUE | ENTRY - ADR | W-C-R ARRAY (MxN) | STATUS |
|---|---|---|---|
| | W0 | 0000_0000 | 0=DONE |
| WRITE → | W1 | 0000_0000 | 1=ACTIVE |
| ADDRESS | W2 | 0000_0000 | 1=ACTIVE |
| POINTER | W3 | 0000_0000 | 1=ACTIVE |
| | W4 | 0000_0000 | 1=ACTIVE |
| | W5 | 0000_0000 | 1=ACTIVE |

*FIG. 7B*

SELECT NEXT EVENT FROM QUEUE (MODE: WRITE-AROUND-READ)    720
- CHECK W1, NEXT WRITE EVENT ->OR'D COLLISION BIT OF "0", CLEAR COLLISION BITS IN THE READ QUEUE FOR BIT 1, SET STATUS OF
- SELECT R4 AS NEXT ENTRY -> CLEAR COLLISION BIT IN THE WRITE QUEUE ARRAY FOR BIT "4", SET STATUS OF R4 TO "DONE", INCREMENT WRITE ADDRESS POINTER

READ QUEUE 722

| ENTRY -ADR | R-C-W ARRAY (NxM) | STATUS |
|---|---|---|
| R0 | 00_0000 | 0=DONE |
| R1 | 00_0000 | 0=DONE |
| R2 | 00_0000 | 0=DONE |
| R3 | 00_0000 | 0=DONE |
| R4 | 00_0000 | 0=DONE |
| R5 | 00_0000 | 1 = ACTIVE |
| R6 | 00_0000 | 1 = ACTIVE |
| R7 | 00_0001 | 1 = ACTIVE |

READ ADDRESS POINTER → R5

WRITE QUEUE

| ENTRY -ADR | W-C-R ARRAY (MxN) | STATUS |
|---|---|---|
| W0 | 0000_0000 | 0=DONE |
| W1 | 0000_0000 | 0=DONE |
| W2 | 0000_0000 | 1=ACTIVE |
| W3 | 0000_0000 | 1=ACTIVE |
| W4 | 0000_0000 | 1=ACTIVE |
| W5 | 0000_0000 | 1=ACTIVE |

WRITE ADDRESS POINTER → W2

SELECT NEXT EVENT FROM QUEUE (MODE: WRITE-AROUND-READ -> READ-AROUND-WRITE)
- DETECT W1 SELECTED -> WRITE QUEUE WITH ONLY 4 ACTIVE EVENTS WAITING (THRESHOLD: SWITCH TO READ AROUND WRITE WHEN WRITE QUEUE HAS 4 OR FEWER ACTIVE ENTRIES)-> SWITCH TO READ AROUND WRITE MODE
- CHECK R5, NEXT READ EVENT -> OR'D COLLISION BIT OF "0", CLEAR COLLISION BITS IN THE W QUEUE FOR BIT "5", SET STATUS OF R5 TO "DONE", INCREMENT THE READ ADDRESS POINTER    724

READ QUEUE 726

| ENTRY -ADR | R-C-W ARRAY (NxM) | STATUS |
|---|---|---|
| R0 | 00_0000 | 0=DONE |
| R1 | 00_0000 | 0=DONE |
| R2 | 00_0000 | 0=DONE |
| R3 | 00_0000 | 0=DONE |
| R4 | 00_0000 | 0=DONE |
| R5 | 00_0000 | 0=DONE |
| R6 | 00_0000 | 1 = ACTIVE |
| R7 | 00_0001 | 1 = ACTIVE |

READ ADDRESS POINTER → R6

WRITE QUEUE

| ENTRY -ADR | W-C-R ARRAY (MxN) | STATUS |
|---|---|---|
| W0 | 0000_0000 | 0=DONE |
| W1 | 0000_0000 | 0=DONE |
| W2 | 0000_0000 | 1=ACTIVE |
| W3 | 0000_0000 | 1=ACTIVE |
| W4 | 0000_0000 | 1=ACTIVE |
| W5 | 0000_0000 | 1=ACTIVE |

WRITE ADDRESS POINTER → W2

*FIG. 7C*

MANAGING OUT-OF-ORDER MEMORY COMMAND EXECUTION FROM MULTIPLE QUEUES WHILE MAINTAINING DATA COHERENCY

CROSS REFERENCE TO RELATED APPLICATIONS

This application is a continuation of commonly assigned U.S. patent application Ser. No. 14/039,301, filed Sep. 27, 2013, which is a continuation of U.S. patent application Ser. No. 13/757,397 filed Feb. 1, 2013, which are hereby incorporated herein by reference.

TECHNICAL FIELD

The embodiment of the invention relates generally to maintaining memory coherency and particularly to managing out-of-order memory command execution from multiple queues while maintaining data coherency.

DESCRIPTION OF THE RELATED ART

Maintaining memory coherency between an internal cache and an external physical memory typically requires that writes and reads to the same external memory location must be executed in a programmed order. Electronic systems that handle streams of read requests and write requests often implement queues for storing incoming read requests and write requests until each request can be executed. In electronic systems that have multiple memory commands waiting to be executed, as long as the system's memory coherency is maintained, performance may be improved by processing memory read commands first before servicing memory write commands.

BRIEF SUMMARY

In view of the foregoing, there is a need for a method, system, and computer program product for managing out-of-order memory command execution from multiple queues while maintaining data coherency.

In one embodiment, a method is directed to an out-of-order controller, responsive to selecting a particular queue from among at least two queues to place an incoming event into within a particular entry from among multiple entries ordered by arrival into the particular queue each comprising a separate collision vector of a number of bits corresponding to a number of other entries in at least one other queue from among the at least two queues, comparing a memory address for the incoming event with each queued memory address for each queued event in the other entries ordered by arrival into the at least one other queue. The method is directed to the out-of-order controller, responsive to the memory address for the incoming event matching at least one particular queued memory address from among each queued memory address for at least one particular queued event from among each queued event in the at least one other queue, setting at least one particular bit in a particular collision vector for the particular entry in at least one bit position from among the bits corresponding with at least one row entry position of the at least one particular queued memory address within the other entries, wherein each set at least one particular bit indicates a memory address collision between a later arriving particular entry in the particular queue and at least one particular queued event in the at least one other queue.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 1 illustrates a block diagram of one example of a system in which out-of-order memory command execution from multiple queues is managed while maintaining data coherency;

FIG. 2 illustrates a block diagram of one example of components of an out-of-order controller for managing out-of-order memory command execution from multiple queues while maintaining data coherency;

FIG. 3 illustrates a block diagram of one example of components of each entry in multiple queues, including a collision vector for each entry of a collision array and a status bit;

FIGS. 6A, 6B, and 6C illustrate a block diagram of one example of an out-of-order controller for managing out-of-order memory command execution from multiple queues while maintaining data coherency;

FIGS. 7A, 7B, and 7C illustrate a block diagram of one example of an out-of-order controller for managing out-of-order memory command execution from multiple queues while maintaining data coherency;

DETAILED DESCRIPTION

Figure 4:
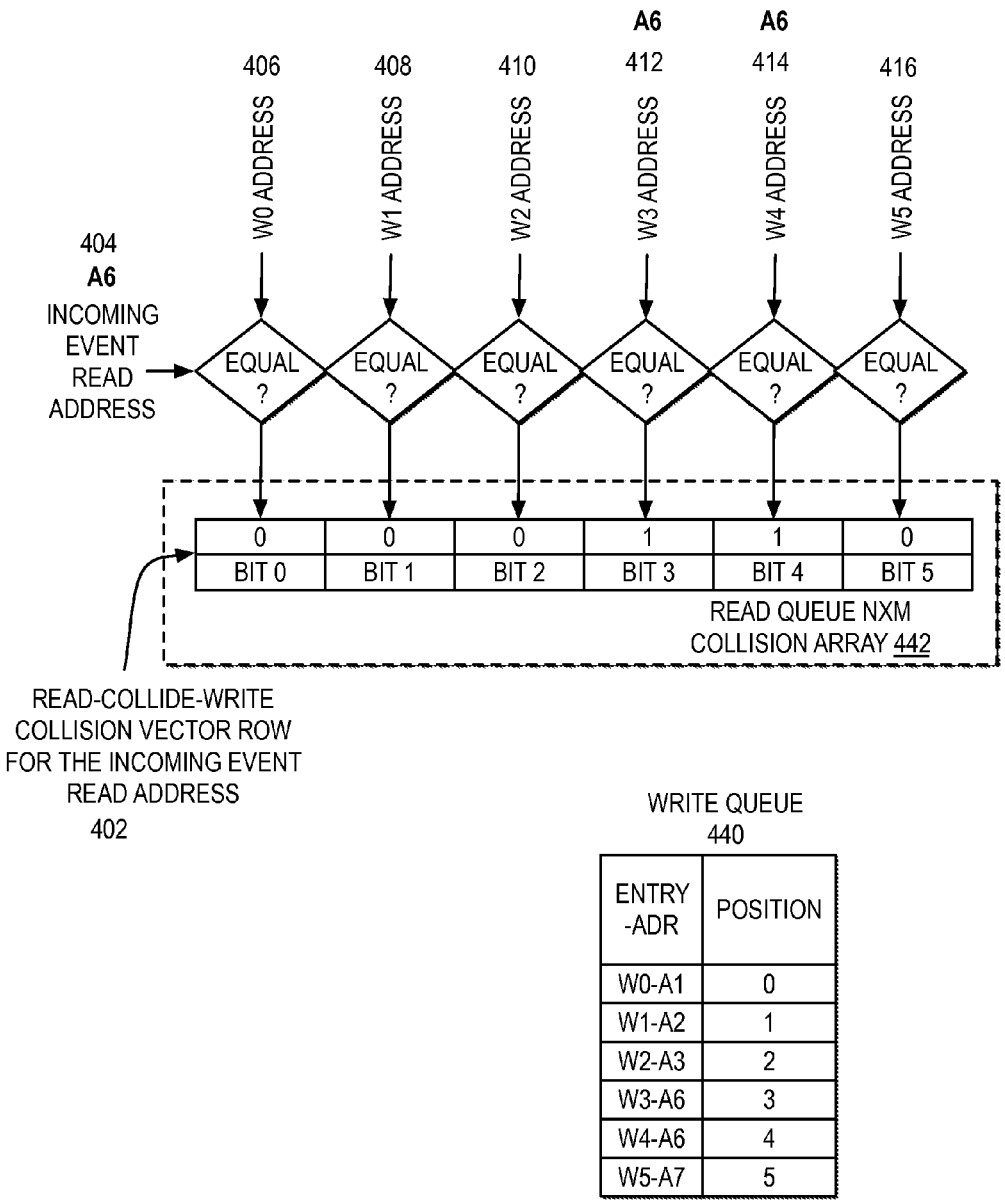
FIG. 4 illustrates a block diagram of one example of a collision detector comparing an address for an incoming read event with the address of write events currently in a write queue and setting bits in the collision vector for the incoming read event where the address from the incoming read event matches an address of a write event currently in the write queue.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

FIG. 1 illustrates a block diagram of one example of a system in which out-of-order memory command execution from multiple queues is managed while maintaining data coherency.

In the example, a receiving interface 104 receives event stream 102 from one or more devices. In the example, event stream 102 may represent a stream of events arriving in a particular order at receiving interface 104 from one or more devices over one or more periods of time. In one example, event stream 102 may be generated by one or more internal cache systems, such as internal cache 120.

In the example, receiving interface 104 identifies one or more classifications of each event received in event stream 102 and selects a queue associated with each event, based on the classification, from among one or more queues in a queue interface 110. In one example, receiving interface 104 may identify whether each event in event stream 102 is classified as a read request or as a write request.

In the example, queue interface 110 includes a queue 106 of a depth of N entries and a queue 108 of a depth of M entries. In one example, only events classified as read requests in event stream 102 are stored in queue 106 and only events classified as write requests in event stream 102 are stored in queue 108. In other embodiments, queue interface 110 may include a single queue or may include additional queues. In one embodiment, the depth of N entries of queue 106 is equal to the depth of M entries of queue 108. In another embodiment, the depth of N entries of queue 106 is not equal to the depth of M entries of queue 108.

In the example, an out-of-order controller 112 may send control signals to and between one or more of receiving interface 104, queue interface 110, and a processing interface 114 to maintain data coherency between internal cache 120 and one or more other memory locations, such as an external memory 116. In another embodiment, one or more components of order controller 112 may be implemented within one or more interfaces or out-of-order controller 112 may be implemented through multiple separate controllers.

In one example, out-of-order controller 112 controls whether events received in event stream 102 at receiving interface 104 are rejected or placed in a queue. In addition, out-of-order controller 112 controls the selection of the particular queue in which a non-rejected event is placed within queue interface 110. Further, out-of-order controller 112 controls tracking and handling of the arrival order of each event into each queue by placing events in each queue in the order received and by processing events within each queue, in order. In addition, out-of-order controller 112 tracks the relative arrival order of read events into queue 106 and write events into queue 108 that access a same address by checking for collisions between addresses for arriving read events with addresses of write events already stored in queue 108 and by checking for collisions between addresses for arriving write events with addresses of read events already stored in queue 106.

In one example, out-of-order controller 112 stores a record of each detected collision by setting a collision bit in an N×M collision array 124 of queue 106 indicating collisions between incoming read events with write events already stored in queue 108 and by setting collision bits in a M×N collision array 126 of queue 108 indicating collisions between incoming write events with read events already stored in queue 106. In the example, N×M collision array 124 includes an M length vector, with a bit position for each of the M entries in queue 108, for each of the N entries in queue 106, and M×N collision array 126 includes an N length vector, with a bit position for each of the N entries in queue 106, for each of the M entries in queue 108. By tracking the arrival order of events into each queue according to the order of event placement in the queue and by tracking the relative arrival order of read events and write events that access a same address in N×M collision array 124, out-of-order controller 112 may implement a read-around-write mode in which read events are given priority and selected for processing, before write events, unless there is an older write event that needs to be handled before the read event. Similarly, by tracking the arrival order of events into each queue according to the order of event placement in the queue and by tracking the relative arrival order of read events and write events that access a same address in M×N collision array 126, out-of-order controller 112 may implement a write-around-read mode in which write events are given priority and selected for processing, before read events, unless there is an older read event that needs to be handled before the write event.

In the example, if out-of-order controller 112 is running a read-around-write mode, then for each next read event in queue 106, the vector in N×M collision array 124 for the entry is logically OR'd together. If the logical OR result is a "0", then there is not a write event waiting in queue 108 that is older than the next read event and out-of-order controller 112 selects the next read event in queue 106 to be processed and clears the bit column in M×N collision array 126 for the selected read event position in queue 106. If the logical OR result is a "1", then there is a write event waiting in queue 108 that is older than the next read event, out-of-order controller 112 selects the next write event in queue 108 to be processed and clears the bit column in N×M collision array 124 for the selected write event position in queue 108.

In the example, if out-of-order controller 112 is running a write-around-read mode, then for each next write event in queue 108, the vector in M×N collision array 126 for the entry is logically OR'd together. If the logical OR result is a "0", then there is not a read event waiting in queue 106 that is older than the next write event and out-of-order controller 112 selects the next write event in queue 108 to be processed and clears the bit column in N×M collision array 124 for the selected write event position in queue 108. If the logical OR result is a "1", then there is a read event waiting in queue 106 that is older than the next write event, out-of-order controller 112 selects the next read event in queue 106 to be processed and clears the bit column in M×N collision array 126 for the selected read event position in queue 106.

FIG. 2 illustrates a block diagram of one example of components of an out-of-order controller for managing out-of-order memory command execution from multiple queues while maintaining data coherency.

In the example, out-of-order controller 112 includes, for handling an incoming event stream, an N entry queue counter 204 set to count N entries and an M entry queue counter 206, set to count M entries, where out-of-order controller 112 uses N entry queue counter 204 to count the number of active entries in queue 106 and uses M entry queue counter 206 to count the number of active entries in queue 108. In the example, read address pointer 208 points to the next entry to be handled in queue 106 and write address pointer 210 points to the next entry to be handled in queue 108.

In the example, a command decoder 220 handles incoming events in event stream 102 to receiving interface 104. In one example, command decoder 220 identifies a particular classification for each event and selects the queue associated with the particular classification from among queue 106 and queue 108, or for any number of additional queues. In one example, command decoder 220 efficiently detects whether an incoming entry can be added to a selected queue or not by checking whether the counter value in the entry queue counter for the selected queue is set to a value indicating all the entries are active and the queue is full. For example, once command decoder 220 classifies the type of incoming event, command decoder 220 detects whether the queue counter for the queue selected for the type of incoming event, from among N entry queue counter 204 and M entry queue counter 206, indicates the selected queue is full. In the example, if command decoder 220 detects that the selected queue is full, command decoder 220 rejects the incoming event. As out-of-order controller 112 selects queue entries for processing by processing interface 114, out-of-order controller 112 reduces the count in the queue counter value associated with the queue from which the entry is processed so that the value in each of N entry queue counter 204 and M entry queue counter 206 reflects the current number of active entries in each queue.

In the example, if command decoder 220 detects that the selected queue is not full, command decoder 220 adds the incoming event as an entry to the selected queue from among queue 106 and queue 108, sets a status bit for the entry to "active", and increments the entry queue counter for the selected queue from among N entry queue counter 204 and M entry queue counter 206. In addition, for each incoming read event placed as an entry to queue 106, collision detector 222 compares the incoming read event address with the addresses of the active write events waiting in queue 108 and for each collision between the read event address and one or more addresses of the active write events in queue 108, collision detector 222 sets one or more bits corresponding to the one or more positions of the one or more colliding write events within a row vector of N×M collision array 124, in the entry row for the incoming read event. In addition, for each incoming write event placed as an entry to queue 108, collision detector 222 compares the incoming write event address with the addresses of the active read events waiting in queue 106 and for each collision between the write event address and one or more addresses of the active read events in queue 106, collision detector 222 sets one or more bits corresponding to the one or more positions of the one or more colliding read events within a row vector of M×N collision array 126, in the entry row for the incoming write event.

In the example, out-of-order controller 112 includes read address pointer 208 to track a next entry in queue 106 and write address pointer 210 to track a next entry in queue 108. Each entry in queue 106 and queue 108 includes a status indicator, such as a status bit, that either indicates the entry is "active", and needs to be processed, or the entry is "done", and should not be processed. As an entry is placed in each of queue 106 and queue 108, the status bit for the entry is marked as "active". As an entry is selected for processing from queue 106 and queue 108, the status bit for the entry is marked as "done".

In the example, out-of-order controller 112 includes a selection controller 236 for selecting a next entry to process from among the active entries pointed to by read address pointer 208 and write address pointer 210. If neither of the entries pointed to by read address pointer 208 and write address pointer 210 have a status bit marked as "active", then selection controller 236 does not select a next entry to be processed. If only one of the entries pointed to by read address pointer 208 and write address pointer 210 have a status bit marked as "active", then selection controller 236 selects the entry pointed to with a status bit marked as "active" as the next entry to process. If both of the entries pointed to by read address pointer 208 and write address pointer 210 have a status bit marked as "active", then selection controller 236 selects the next entry to process based on whether selection controller 236 is operating in a read around mode 238 or a write around mode 240.

In read-around-write mode 238, selection controller 236 selects each next read event with a status bit marked as "active" as the next entry to process, as long as there is a next read event with a status bit marked as "active", unless the vector row in N×M collision array 124 for the next read event includes bits indicating that the next read event collides with at least one write event with a status bit marked as "active". In one example, selection controller 236 determines whether a next read event includes bits indicating that the next read event collides with at least one write event with a status bit marked as "active" by performing a logical OR operation on all the bits in the vector row for the next read event. If the logical OR operation on all the bits in the vector row for the next read event results in a "1", then selection controller 236 detects that the next read event collides with at least one write event with a status bit marked as "active". If the logical OR operation results in a "1", then selection controller 236 selects the next write event as the next entry to process and clears the bit correlated with the M entry row of the write event in queue 108 from the corresponding M bit column in N×M collision array 124. After selecting the next write event, selection controller 236 continues to select each next read event with a status bit marked as "active" as the next entry to process, as long as there is a next read event with a status bit marked as "active", unless the vector row in N×M collision array 124 for the next read event includes bits indicating that the next read event collides with at least one write event with a status bit marked as "active".

In write-around-read mode 240, selection controller 236 selects each next write event with a status bit marked as "active" as the next entry to process, as long as there is a next write event with a status bit marked as "active", unless the vector row in M×N collision array 126 for the next write event includes bits indicating that the next write event collides with at least one read event with a status bit marked as "active". In one example, selection controller 236 determines whether a next write event includes bits indicating that the next write event collides with at least one read event with a status bit marked as "active" by performing a logical OR operation on all the bits in the vector row for the next write event. If the logical OR operation on all the bits in the vector row for the next write event results in a "1", then selection controller 236 detects that the next write event collides with at least one read event with a status bit marked as "active". If the logical OR operation results in a "1", then selection controller 236 selects the next read event as the next entry to process and clears the bit correlated with the N entry row of the read event in queue 106 from the corresponding N bit column in M×N collision array 126. After selecting the next read event, selection controller 236 continues to select each next write event with a status bit marked as "active" as the next entry to process, as long as there is a next write event with a status bit marked as "active", unless the vector row in M×N collision array 126 for the next write event includes bits indicating that the next write event collides with at least one read event with a status bit marked as "active".

In the example, out-of-order controller 112 includes a mode selector 230 for specifying the mode, from among read-around-write mode 238 and write-around-read mode 240, for selection controller 236 to perform. In one example, an administrator or external service may send signals to out-of-order controller 112 to set the current mode selection by mode selector 230. In another example, mode selector 230 may automatically specify read-around-write mode 238 as the mode for selection controller 236 to perform, unless a condition is triggered based on one or more settings in thresholds 234.

In one example, thresholds 234 may specify a first write queue threshold that specifies a maximum number of write entries that can be added to queue 108, while the mode is set to read-around-write mode 238, before mode selector 230 switches the mode to write-around-read mode 240. In another example, thresholds 234 may specify a second write queue threshold that specifies a minimum number of write entries when in write-around-read mode 240, where if the number of write entries in queue 108 is less than the minimum number of entries, mode selector 230 switches the mode to read-around-write mode 240. In another example, thresholds 234 may specify a read queue threshold that specifies a maximum number of read entries that can be added to queue 106 and remain active, while the mode is set to write-around-read mode 240, before mode selector 230 switches the mode to read-around-write mode 238. In other examples, thresholds 234 may set thresholds on the number of read events that can be consecutively processed while in read-around-write mode 238 without a write event being processed before mode selector 230 switches to write-around-read mode 240 and similarly, thresholds 234 may set thresholds on the number of write events that can be consecutively processed while in write-around-read mode 240 before mode selector 230 switches to read-around-write mode 238. By mode selector 230 selecting to switch between read-around-write mode 238 and write-around-read mode 234 based on one or more thresholds, mode selector 230 avoids stagnation of active write events while in read-around-write mode 238 and avoids stagnation of active read events while in write-around-read mode 240.

FIG. 3 illustrates a block diagram of components of each entry in multiple queues, including a collision vector for each entry of a collision array and a status bit.

In the example, multiple components are illustrated in queue 106 and queue 108, including a collision vector for each entry from N×M collision array 124 in queue 106 or from M×N collision array 126 in queue 108. In the example, an event entry 300 within queue 106 or queue 108 includes a first column with an event identifier 302. Event identifier 302 may include one or more command attributes 312, including but not limited to a starting address, a size of a transaction, and a byte-enable bit setting. In the example, the starting address and size of a transaction may designate the address or addresses being read from or written to for an event entry.

In the example, event entry 300 also includes a second column with a collision vector 304 that is a read-collide-write (R-C-W) vector, if in queue 106, or write-collide-read (W-C-R) vector, if in queue 108. In queue 106, collision vector 304 represents a M bit long vector for each entry position N, from N×M collision array 124. In queue 108, collision vector 304 represents an N bit long vector for each entry position M, from M×N collision array 126. In the example, as illustrated at reference numeral 314, each bit in collision vector 304 indicates whether the command has an address match with an address for an entry in another queue in a row corresponding with the bit.

In the example, event entry 300 also includes a third column with a status bit 306. In the example, status bit 306 may include a status bit set in a status bit register to indicate whether event entry 300 is pending, or "active", set as "1", or has been processed, or is "done", set as "0". In additional or alternate examples, event entry 300 may include additional or alternate data.

In additional or alternate examples, event entry 300 may include additional or alternate data. In additional or alternate examples, each of the columns illustrated in event entry 300 may be stored in a same data or memory structure or distributed across multiple data or memory structures.

FIG. 4 illustrates a block diagram illustrating a collision detector comparing an address for an incoming read event with the addresses of write events currently in a write queue and setting bits in the collision vector for the incoming read event where the address from the incoming read event matches an address of a write event currently in the write queue. In the example, a read queue includes a read queue N×M collision array 442, including, for an incoming read event 404, a read-collide-write collision vector row 402, from among N vector rows. In the example, vector row 402 includes M bits, labeled as bit "0", bit "1", bit "2", bit "3", bit "4", and bit "5". In the example, a write queue 440 includes M entries. In the example, bit "0" in vector row 402 correlates with the write entry in position "0" of write queue 420, bit "1" in vector row 402 correlates with the write entry in position "1" of write queue 420, bit "2" in vector row 402 correlates with the write entry in position "2" of write queue 420, bit "3" in vector row 402 correlates with the write entry in position "3" of write queue 420, bit "4" in vector row 402 correlates with the write entry in position "4" of write queue 420, and bit "5" in vector row 402 correlates with the write entry in position "5" of write queue 420.

In the example, collision detector 222 compares incoming read event address 404 with an address of "A6" with the addresses for the write events stored in write queue 420, illustrated as a W0 address 406, for the write event W0 stored in position "0" in write queue 420, a W1 address 408, for the write event W1 stored in position "1" in write queue 420, a W2 address 410, for the write event W2 stored in position "2" in write queue 420, a W3 address 412, for the write event W3 stored in position "3" in write queue 420, a W4 address 414, for the write event W4 stored in position "4" in write queue 420, and a W5 address 416 for the write event W5 stored in position "5" in write queue 420. In the example, W3 address 412 and W4 address 414 are write events for the address labeled as "A6", equal to the incoming read address 404 of "A6". In the example, because the address for W3 address 412 and W4 address 414 are for address "A6", matching incoming read address 404 of "A6", then collision detector 222 sets bit "3" in vector row 402, corresponding with the entry in position "3" for W3 address 412, and bit "4" in vector row 402, corresponding with the entry in position "4" for W4 address 412. In the example, by setting bit "3" and bit "4" in vector row 402, the write events in positions "3" and "4" of write queue 440 both have to be selected for processing, clearing bits "3" and "4, before the incoming read event can be selected for processing.

Figure 5:
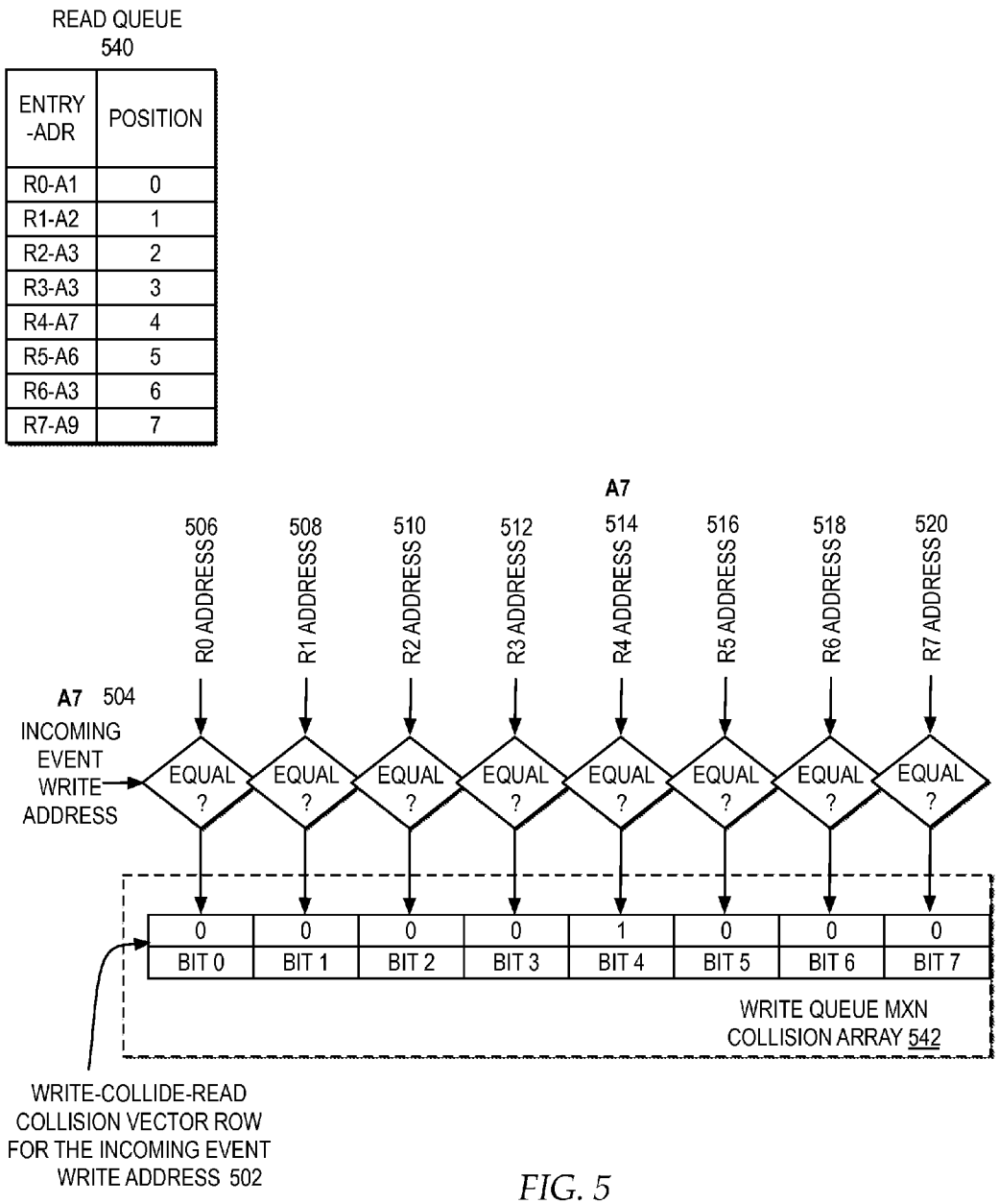
FIG. 5 illustrates a block diagram of one example of a collision detector comparing an address for an incoming write event with the address of read events currently in a read queue and setting bits in the collision vector for the incoming write event where the address from the incoming write event matches an address of a read event currently in the read queue.

FIG. 5 illustrates a block diagram illustrating a collision detector comparing an address for an incoming write event with the address of read events currently in a read queue and setting bits in the collision vector for the incoming write event where the address from the incoming write event matches an address of a read event currently in the read queue. In the example, a write queue includes a write queue M×N collision array 542, including, for an incoming write event 504, a write-collide-read collision vector row 502, from among M vector rows. In the example, vector row 502 includes N bits, labeled as bit "0", bit "1", bit "2", bit "3", bit "4", bit "5", bit "6", and bit "7". In the example, a read queue 540 includes N entries. In the example, bit "0" in vector row 502 correlates with the read entry in position "0" of read queue 520, bit "1" in vector row 502 correlates with the read entry in position "1" of read queue 520, bit "2" in vector row 502 correlates with the read entry in position "2" of read queue 520, bit "3" in vector row 502 correlates with the read entry in position "3" of read queue 520, bit "4" in vector row 502 correlates with the read entry in position "4" of read queue 520, bit "5" in vector row 502 correlates with the read entry in position "5" of read queue 520, bit "6" in vector row 502 correlates with the read entry in position "6" of read queue 520, and bit "7" in vector row 502 correlates with the read entry in position "7" of read queue 520.

In the example, collision detector 222 compares incoming write event address 504 with a label of "A7" with the addresses for the read events stored in read queue 520, illustrated as a R0 address 506, for the read event R0 stored in position "0" in read queue 520, a R1 address 508, for the read event R1 stored in position "1" in read queue 520, a R2 address 510, for the read event R2 stored in position "2" in read queue 520, a R3 address 512, for the read event R3 stored in position "3" in read queue 520, a R4 address 514, for the read event R4 stored in position "4" in read queue 520, a R5 address 516 for the read event R5 stored in position "5" in read queue 520, a R6 address 518 for the read event R6 stored in position "6" in read queue 520, and a R7 address 520 for the read event R7 stored in position "7" in read queue 520. In the example, R4 address 514 is a read event for the address labeled as "A7", matching incoming write address 504 of "A7". In the example, because the address for R4 address 514 is for address "A7", matching incoming write address 504 of "A7", then collision detector 222 sets bit "4" in vector row 502, corresponding with the entry in position "4" for R4 address 512. In the example, by setting bit "4" in vector row 502, the read event in position "4" of read queue 540 has to be selected for processing, clearing bit "4", before the incoming write event can be selected for processing.

Figure 6B:
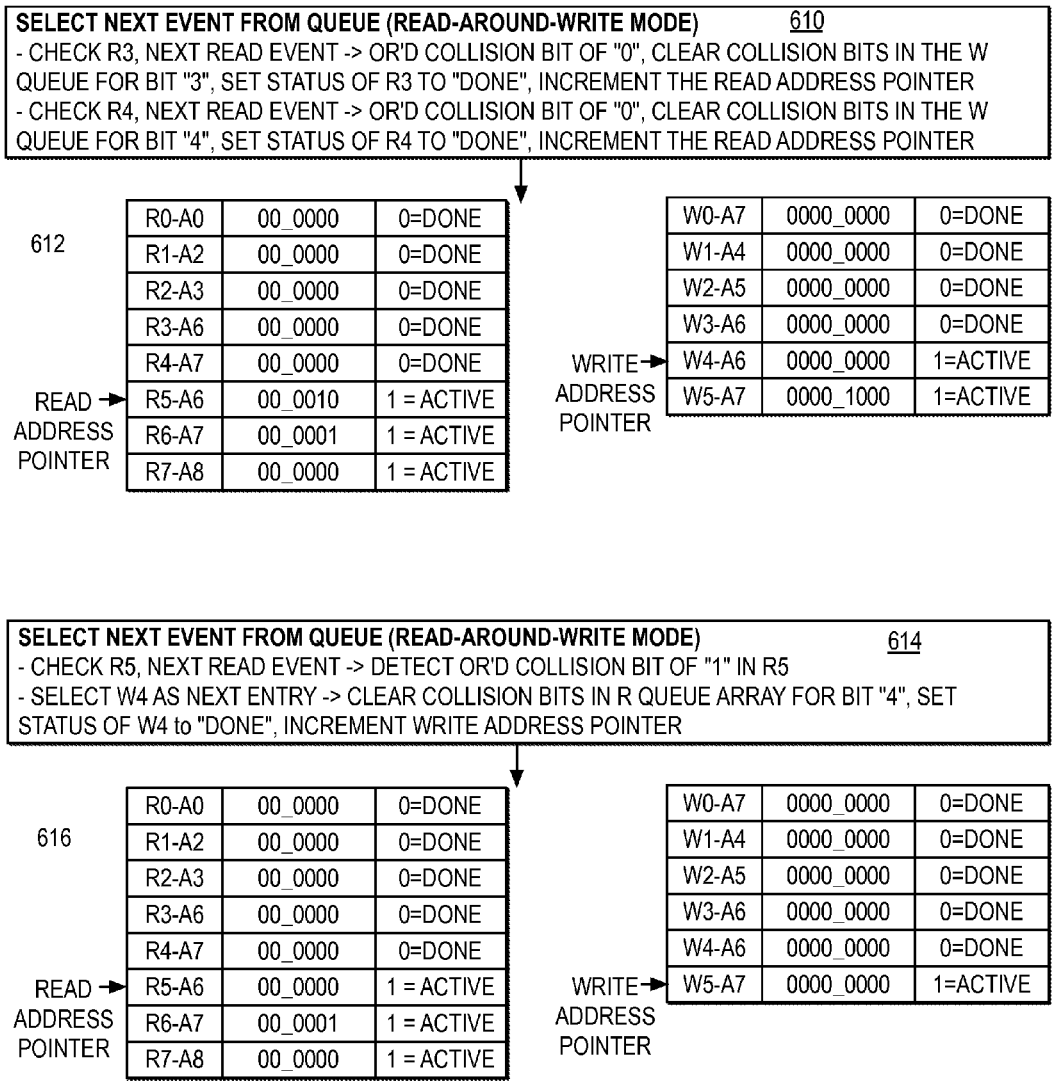
Figure 6C:
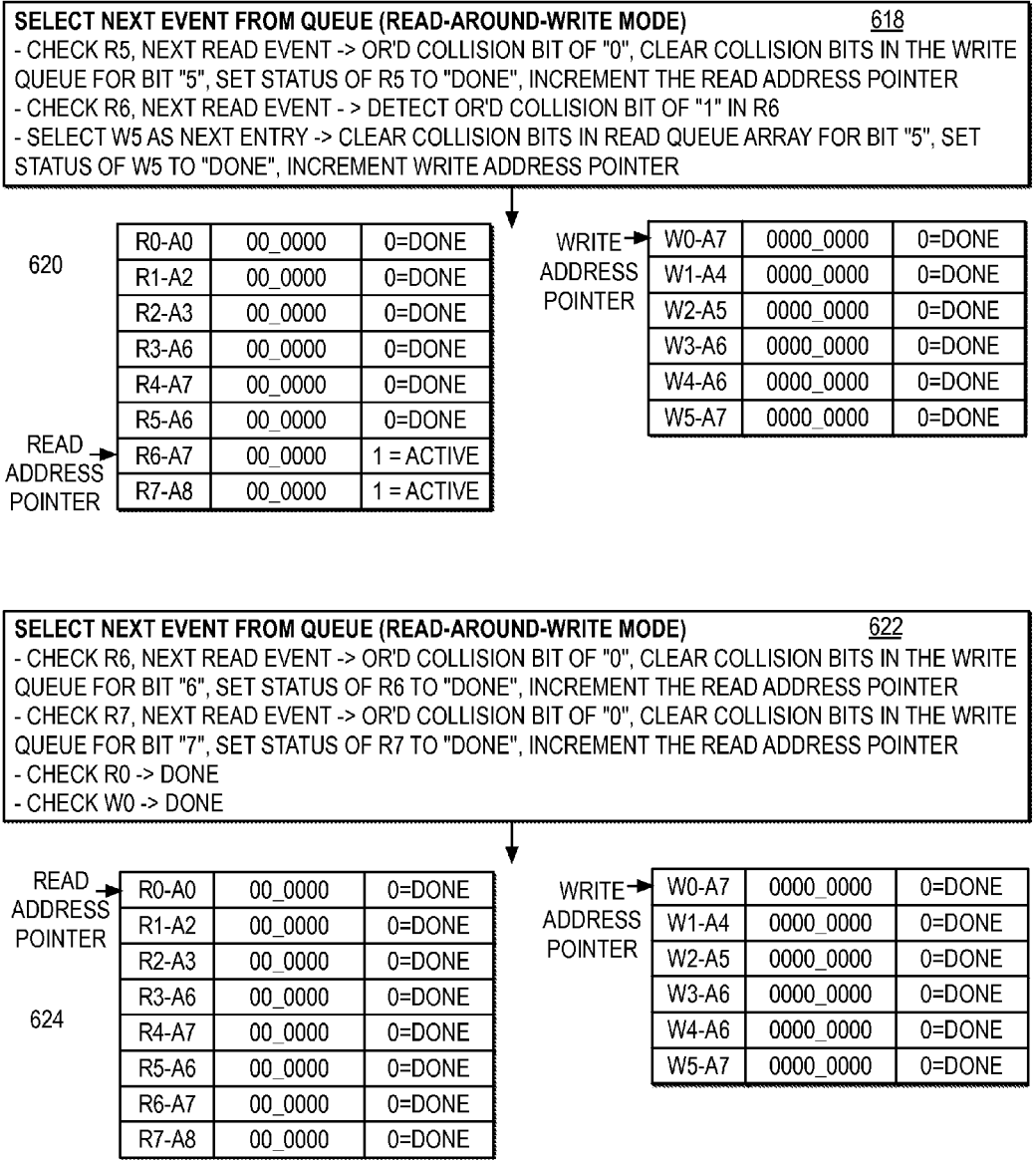

FIGS. 6A, 6B, and 6C illustrate a block diagram of one example of an out-of-order controller for managing out-of-order memory command execution from multiple queues while maintaining data coherency.

In the example, an incoming event stream sequence 602 is illustrated for incoming entries placed in one of two queues, where N is set to a depth of 8 entries and M is set to a depth of 6 entries, as illustrated in a queue status 604. In the example, as illustrated in queue status 604, a read queue includes entries in positions "0", "1", and "2" with status bits that are marked "done" and a write queue includes entries in positions "0", "1", and "2" with status bits that are marked "done". The read address pointer points to an entry "R3" in position "3" in the read queue and the write address pointer points to an entry "W3" in position "3" in the write queue. In one example, sequence 602 illustrates one example of the sequence of incoming events that direct the entries that are stored by out-of-order controller 112 in the read queue in positions "3", "4", "5", "6", and "7" and in the write queue in positions "3", "4", and "5". In the example illustrated in sequence 602, out-of-order controller 112 receives a write entry with an address "A6" and, places the write entry in entry "W3" of the write queue, with no collision bits set because incoming write event address "A6" does not match any addresses of active entries in the read queue, and sets the status bit to "active". Next, out-of-order controller 112 receives a read entry with an address "A6" and places the read entry in entry R3 of the read queue, with collision bits set to "00_0100", where bit "3" is set in the vector row of the read collision array, because the incoming read address of "A6" matches the address "A6" in the entry in position "3" in the write queue, and sets the status bit to "active". Next, in the example illustrated in sequence 602, out-of-order controller 112 receives a write entry with an address "A6" and places the write entry in entry W4 of the write queue, with collision bits set to "0001_0000", where bit "3" is set in the vector row of the write queue collision array, because the incoming write address of "A6" matches the address "A6" in the entry in position "3" in the read queue, and sets the status bit to "active". Next, in the example illustrated in sequence 602, out-of-order controller 112 receives a read entry with an address "A7" and places the read entry in entry "R4" of the read queue, with no collision bits set because even though the entry in position "0" of the write queue has an address of "A7" the status bit for the entry is set to "done", therefore incoming read event address "A7" does not match any addresses of active entries in the read queue. Next, in the example illustrated in sequence 602, out-of-order controller 112 receives a write entry with an address "A7" and places the write entry in entry W5 of the write queue, with collision bits set to "0000_1000", where bit "4" is set in the vector row of the write queue collision array, because the incoming write address of "A7" matches the address "A7" in the entry in position "4" in the read queue, and sets the status bit to "active". Next, in the example illustrated in sequence 602, out-of-order controller 112 receives a read entry with an address "A6" and places the read entry in entry R5 of the write queue, with collision bits set to "00_0110", where bits "3" and "4" are set in the vector row of the read queue collision array, because the incoming read address of "A6" matches the address "A6" in the entry in position "3" and in position "4" in the write queue, and sets the status bit to "active". Next, in the example illustrated in sequence 602, out-of-order controller 112 receives a read entry with an address "A7" and places the read entry in entry R6 of the read queue, with collision bits set to "00_0001", where bit "5" is set in the vector row of the read queue collision array, because the incoming write address of "A7" matches the address "A7" in the entry in position "5" in the write queue, and sets the status bit to "active". Next, in the example illustrated in sequence 602, out-of-order controller 112 receives a read entry with an address "A8" and places the write entry in entry "R7" of the read queue, with no collision bits set because incoming read event address "A8" does not match any addresses of active entries in the write queue, and sets the status bit to "active". Queue status 604 reflects the status of the read and write queues after selection controller 236 performs the steps in sequence 602.

Next, as illustrated in a sequence 606, selection controller 236, operating in read-around-write mode 238, checks the next read event pointed to by the read address pointer in the read queue, "R3", for any collisions with older write entries by performing a logical OR operation on the vector row bits "00_0100" for entry "R3". The result of the logical OR operation is "1", therefore selection controller 236 selects the next active write event, W3, as the next entry, clears the collision bits in the read queue collision array for the column set to bit "3", sets the status bit of "W3" to "done", and increments the write address pointer to point to W4. A queue status 608 reflects the status of the read and write queues after selection controller 236 performs the steps in sequence 606.

Next, as illustrated in a sequence 610, selection controller 236 checks the next read event pointed to by the read address pointer in the read queue, which is still "R3", for any collisions with older write entries by performing a logical OR operation on the vector row bits now set to "00_0000" for entry "R3". The result of the logical OR operation is "0", therefore selection controller 236 detects no collisions and selects read event R3 as the next entry for processing, clears the collision bits in the write queue collision array for the column set to bit "3", sets the status of event "R3" to "done", and increments the read address pointer. Next, as illustrated in sequence as illustrated in queue status 604, selection controller 236 checks the next read event pointed to by the read address pointer in the read queue, which is now event "R4", for any collision with older write entries by performing a logical OR operation on the vector row bits set to "00_0000" for entry "R4". The result of the logical OR operation is "0", therefore selection controller 236 detects no collisions and selects read event "R4" as the next entry for processing, clears the collision bits in the write queue collision array for the column set to bit "4", sets the status of event "R4" to "done", and increments the read address pointer. A queue status 612 reflects the status of the read and write queues after selection controller 236 performs the steps in sequence 610.

Next, as illustrated in a sequence 614, selection controller 236 checks the next read event pointed to by the read address pointer in the read queue, "R5", for any collisions with older write entries by performing a logical OR operation on the vector row bits "00_0010" for entry "R5". The result of the logical OR operation is "1", therefore selection controller 236 selects the next active write event, W4, as the next entry, clears the collision bits in the read queue collision array for the column set to bit "4", sets the status bit of "W4" to "done", and increments the write address pointer to point to W5. A queue status 616 reflects the status of the read and write queues after selection controller 236 performs the steps in sequence 614.

Next, as illustrated in a sequence 618, selection controller 236 checks the next read event pointed to by the read address pointer in the read queue, which is still "R5", for any collisions with older write entries by performing a logical OR operation on the vector row bits now set to "00_0000" for entry "R5". The result of the logical OR operation is "0", therefore selection controller 236 detects no collisions and selects read event R5 as the next entry for processing, clears the collision bits in the write queue collision array for the column set to bit "5", sets the status of event "R5" to "done", and increments the read address pointer. Next, as illustrated in sequence 618, selection controller 236 checks the next read event pointed to by the read address pointer in the read queue, "R6", for any collisions with older write entries by performing a logical OR operation on the vector row bits "00_0001" for entry "R6". The result of the logical OR operation is "1", therefore selection controller 236 selects the next active write event, W5, as the next entry, clears the collision bits in the read queue collision array for the column set to bit "5", sets the status bit of "W5" to "done", and increments the write address pointer to point to W0. A queue status 620 reflects the status of the read and write queues after selection controller 236 performs the steps in sequence 618.

Next, as illustrated in a sequence 622, selection controller 236 checks the next read event pointed to by the read address pointer in the read queue, which is still "R6", for any collisions with older write entries by performing a logical OR operation on the vector row bits now set to "00_0000" for entry "R6". The result of the logical OR operation is "0", therefore selection controller 236 detects no collisions and selects read event R6 as the next entry for processing, clears the collision bits in the write queue collision array for the column set to bit "6", sets the status of event "R6" to "done", and increments the read address pointer. Next, as illustrated in sequence 622, selection controller 236 checks the next read event pointed to by the read address pointer in the read queue, which is "R7", for any collisions with older write entries by performing a logical OR operation on the vector row bits set to "00_0000" for entry "R7". The result of the logical OR operation is "0", therefore selection controller 236 detects no collisions and selects read event R7 as the next entry for processing, clears the collision bits in the write queue collision array for the column set to bit "7", sets the status of event "R7" to "done", and increments the read address pointer to point to R0. Both the read address pointer, pointing to R0, and the write address pointer, pointing to W0, are point to entries with status bits set to "done", therefore selection controller 236 detects that there are no additional events currently available for processing. A queue status 624 reflects the status of the read and write queues after selection controller 236 performs the steps in sequence 622.

Figure 7A:
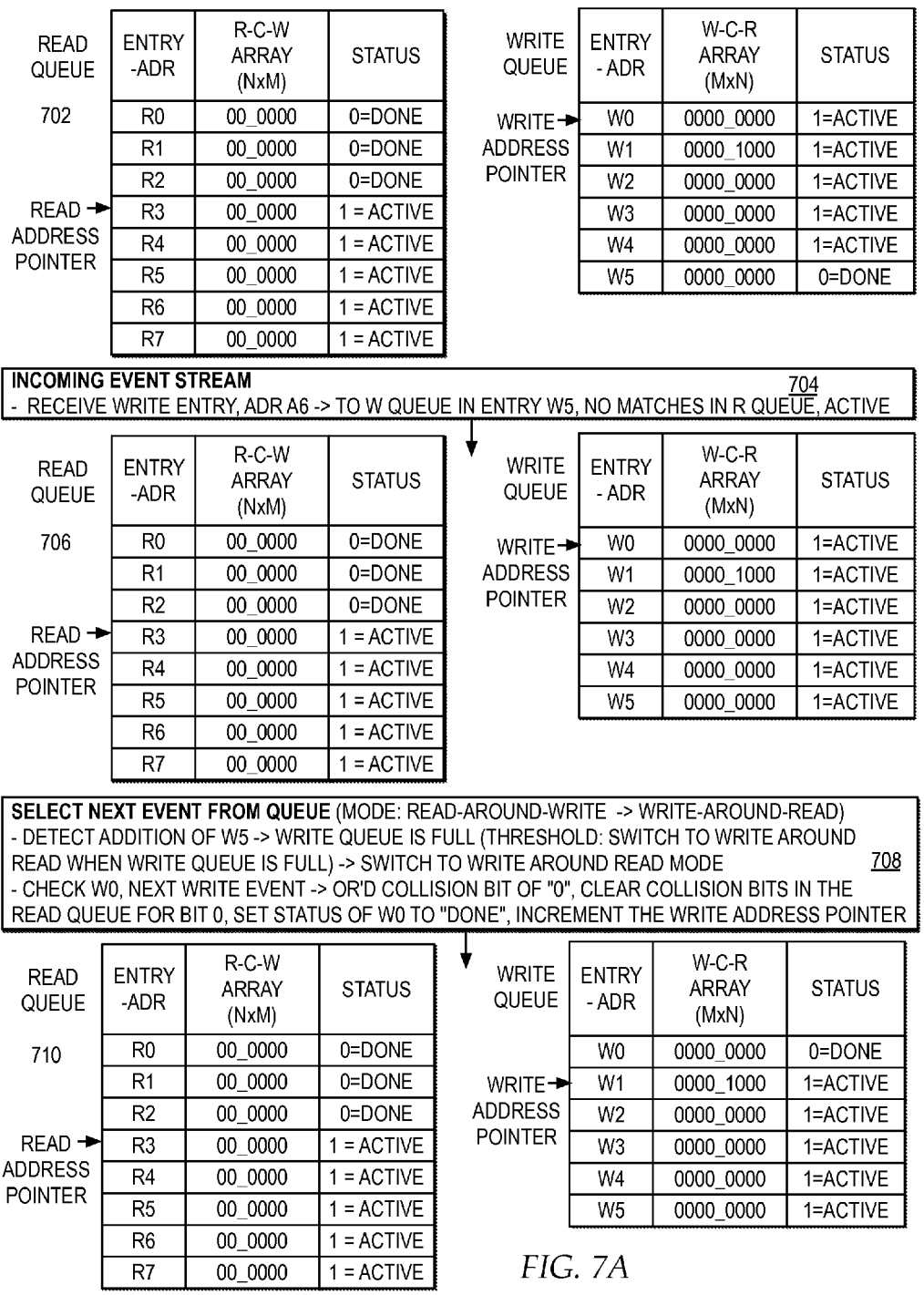

FIGS. 7A, 7B, and 7C illustrate a block diagram of one example of an out-of-order controller for managing out-of-order memory command execution from multiple queues while maintaining data coherency.

In the example, a queue status 702 reflects the current status of entries within a read queue, where N is set to a depth of 8 entries, and a write queue, where M is set to a depth of 6 entries. In the example, queue status 702 illustrates the read queue with 5 entries with a status bit set to "active" and the write queue with 5 entries with a status bit set to "active". In the example, as illustrated in a sequence 704, for an incoming event stream, a write entry is received and placed in the write queue in entry W5, and set to "active". In the example, the incoming write entry address does not match any of the addresses of active read events in the read queue, therefore the vector row in the M×N collision array for W5 is set to "0000_0000". A queue status 706 reflects the write queue after sequence 704 is performed.

Next, as illustrated in a sequence 708, selection controller 236, initially executing in read-around-write mode, detects the addition of W5. Mode selector 230 compares the current status of the write queue with thresholds 234, which include a threshold of "switch to write-around-read mode when the write queue is full". In the example, mode selector 230 detects that the write queue is full and switches the current mode from the read-around-write mode to the write-around-read mode. In write-around-read mode, selection controller 236 checks W0, the next write event pointed to by the write address pointer, for any collisions by performing a logical OR operation on the vector row for W0 in the M×N collision array of "0000_0000", resulting in a "0". In the example, when selection controller 236 detects the logical OR operation result of "0", selection controller 236 clears the collision bits in the read queue for bit "0", sets the status of W0 to "done", and increments the write address pointer. A queue status 710 reflects the read queue and write queue after sequence 708 is performed.

Next, as illustrated in a sequence 712, selection controller 236, executing in write-around-read mode, checks W1, the next write event pointed to by the write address pointer, for any collisions by performing a logical OR operation on the vector row for W1 in the M×N collision array of "0000_1000", resulting in a "1". In the example, when selection controller 236 detects the logical OR operation result of "1", selection controller 236 selects the next read event, R3, as the next entry for processing, clears the collision bits in the write queue array for bit "3", sets the status of R3 to "done", and increments the read address pointer. A queue status 714 reflects the read queue and write queue after sequence 712 is performed.

Next, as illustrated in a sequence 716, selection controller 236, executing in write-around-read mode, checks W1, the next write event pointed to by the write address pointer, for any collisions by performing a logical OR operation on the vector row for W1 in the M×N collision array of "0000_1000", resulting in a "1". In the example, when selection controller 236 detects the logical OR operation result of "1", selection controller 236 selects the next read event, R4, as the next entry for processing, clears the collision bits in the write queue array for bit "4", sets the status of R4 to "done", and increments the read address pointer. A queue status 718 reflects the read queue and write queue after sequence 716 is performed.

Next, as illustrated in sequence 720, selection controller 236, executing in write-around-read mode, checks W1, the next write event pointed to by the write address pointer, for any collisions by performing a logical OR operation on the vector row for W1 in the M×N collision array of "0000_0000", resulting in a "0". In the example, when selection controller 236 detects the logical OR operation result of "0", selection controller 236 clears the collision bits in the read queue for bit "0", sets the status of W1 to "done", and increments the write address pointer. A queue status 722 reflects the read queue and write queue after sequence 720 is performed.

Next, as illustrated in a sequence 724, selection controller 236, initially executing in write-around-read mode, detects that the number of active events waiting in the write queue has decreased to "4", after the selection of write event W1. Mode selector 230 compares the current status of the write queue with thresholds 234, which include a threshold of "switch to read-around-write mode when the write queue has 4 or fewer active entries". In the example, mode selector 230 detects that the number of active entries in the write queue has decremented to "4" and switches the current mode from the write-around-read mode to the read-around-write mode. In read-around-write mode, selection controller 236 checks R5, the next read event pointed to by the read address pointer, for any collisions by performing a logical OR operation on the vector row for R5 in the N×M collision array of "00_0000", resulting in a "0". In the example, when selection controller 236 detects the logical OR operation result of "0", selection controller 236 clears the collision bits in the write queue for bit "5", sets the status of R5 to "done", and increments the read address pointer. A queue status 726 reflects the read queue and write queue after sequence 724 is performed.

Figure 8:
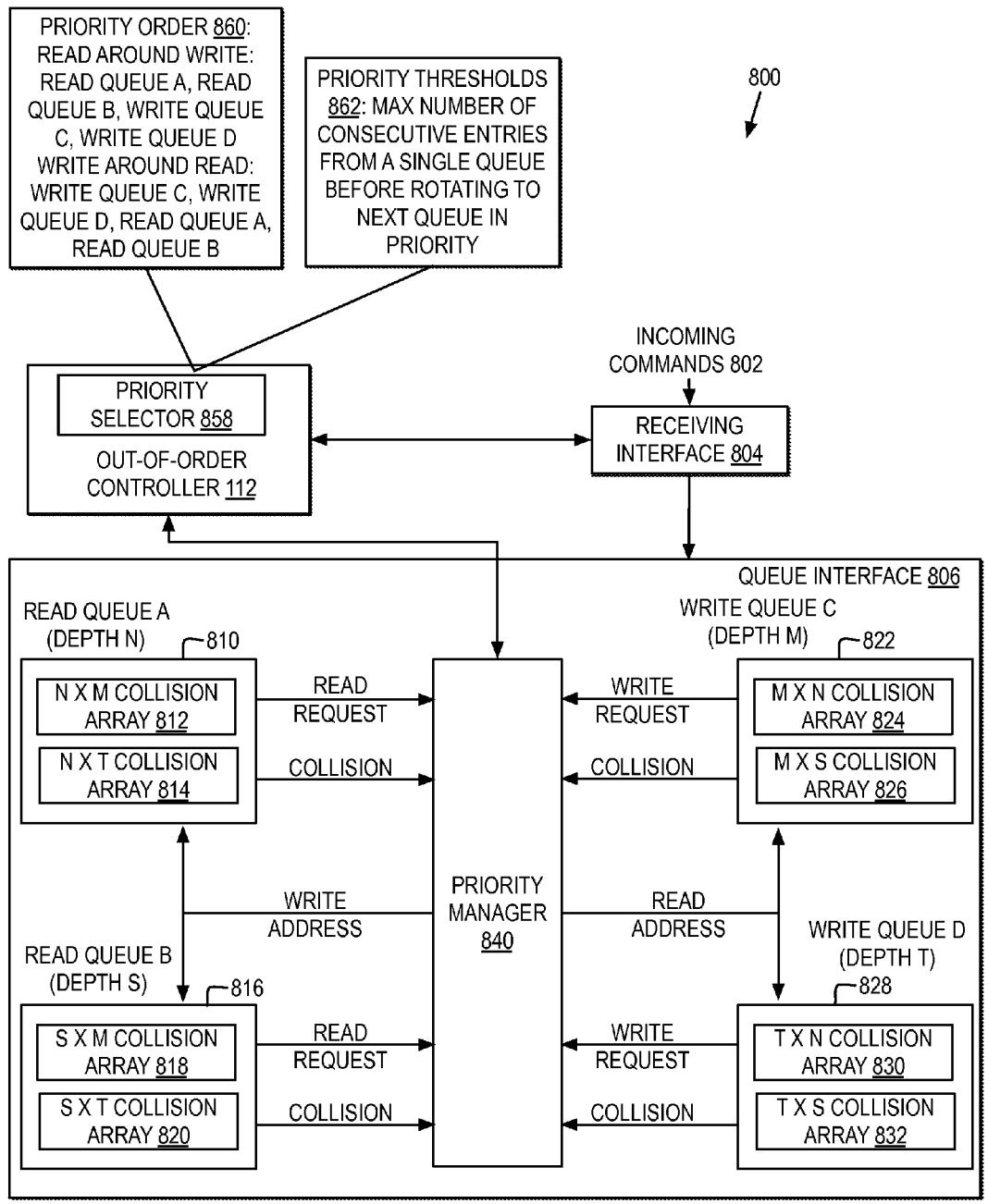
FIG. 8 illustrates a block diagram of one example of a system in which out-of-order memory command execution from more than two queues is managed while maintaining data coherency.

FIG. 8 illustrates a block diagram of one example of a system in which out-of-order memory command execution from more than two queues is managed while maintaining data coherency. In the example, a queue system 800 includes incoming commands 802 with incoming read events of multiple types and incoming write events of multiple types. A queue interface 806 includes a read queue A 810, a read queue B 816, a write queue C 822, and a write queue D 828. In the example, a receiving interface 804 receives incoming read events within incoming commands 802 and either places each incoming read event in one of read queue A 810 or read queue B 816, or rejects the incoming read event if the read queues are full. In addition, receiving interface 804 receives incoming write events within incoming commands 802 and either places each incoming write event in one of write queue A 822 or write queue B 828, or rejects the incoming write event if the write queues are full. In one example, out-of-order controller 112 may direct receiving interface 804 to prioritize incoming read events and incoming write events according to one or more requirements, such as, but not limited to, one or more latency requirements. In one example, receiving interface 804 prioritizes central processing unit (CPU) read events above direct memory access (DMA) read events and places CPU read events in read queue A 810 and DMA read events in read queue B 816. In another example, receiving interface 804 prioritizes CPU write events above DMA write events and places CPU write events in write queue A 822 and DMA write events in write queue B 828. Although not depicted, out-of-order controller 112 includes entry queue counters and address pointers for each of read queue A 810, read queue B 816, write queue A 822, and write queue B 828.

In the example, a priority manager 840 may be implemented for out-of-order controller 112 to manage the signals and requests between more than two queues for implementing collision detector 222. In the example, N is the depth of read queue A 810, S is the depth of read queue B 816, M is the depth of write queue C 822, and T is the depth of write queue D 828. In the example, collision detector 222 tracks collisions between any read events placed in read queue A 810 and any active write events pending in write queue C 822, by marking bits in columns corresponding to rows in write queue C 822 in an N×M array 812, and tracks collisions between read events placed in read queue A 810 and any active write events pending in write queue D 828, by marking bits in columns corresponding to rows in an N×T array 814. In the example, collision detector 222 tracks collisions between any read events placed in read queue B 816 and any active write events pending in write queue C 822, by marking bits in columns corresponding to rows in write queue C 822 in an S×M array 816, and tracks collisions between read events placed in read queue B 816 and any active write events pending in write queue D 828, by marking bits in columns corresponding to rows in an S×T array 820. In the example, collision detector 222 tracks collisions between any write events placed in write queue C 822 and any active read events pending in read queue A 810, by marking bits in columns corresponding to rows in read queue A 810 in an M×N array 824, and tracks collisions between write events placed in write queue C 822 and any active read events pending in read queue B 816, by marking bits in columns corresponding to rows in an M×S array 826. In the example, collision detector 222 tracks collisions between any write events placed in write queue D 828 and any active read events pending in read queue A 810, by marking bits in columns corresponding to rows in read queue A 810 in an T×N array 830, and tracks collisions between write events placed in write queue D 828 and any active read events pending in read queue B 816, by marking bits in columns corresponding to rows in an T×S array 832.

In the example, out-of-order controller 112 may also implement a priority selector 858 that selects the next queue to select events from, and check event collisions within, while operating in each of the operational modes. In one example, priority selector 858 accesses priority order 860 that specifies the current order of priority to be given to each of the queues for read-around-write mode and for write-around-read mode by out-of-order controller 112. In one example, priority order 860 specifies that when out-of-order controller 112 is operating in read-around-write mode 238, selection controller 236 should select entries for processing in the following order unless collisions are detected: read queue A, read queue B, write queue A, and write queue B. In the example, priority order 860 also specifies that when out-of-order controller 112 is operating in write-around-read mode 240, selection controller 236 should select entries for processing in the following order unless collisions are detected: write queue C, write queue D, read queue A, read queue B. In one example, priority order 860 is dynamically adjustable according to current performance metrics detected by a performance monitoring tool.

In addition, in the example, out-of-order controller 112 may include priority thresholds 862 that specify conditions for priority selector 858 adjusting the next queue to select events from, and check for collisions within, based on current conditions, to avoid stagnation of read events or write events in the queues of lower priority in priority order 860. For example, priority thresholds 862 may specify the maximum number of entries that can be consecutively selected from a single queue before rotating to the next queue according to priority order 860.

Figure 9:
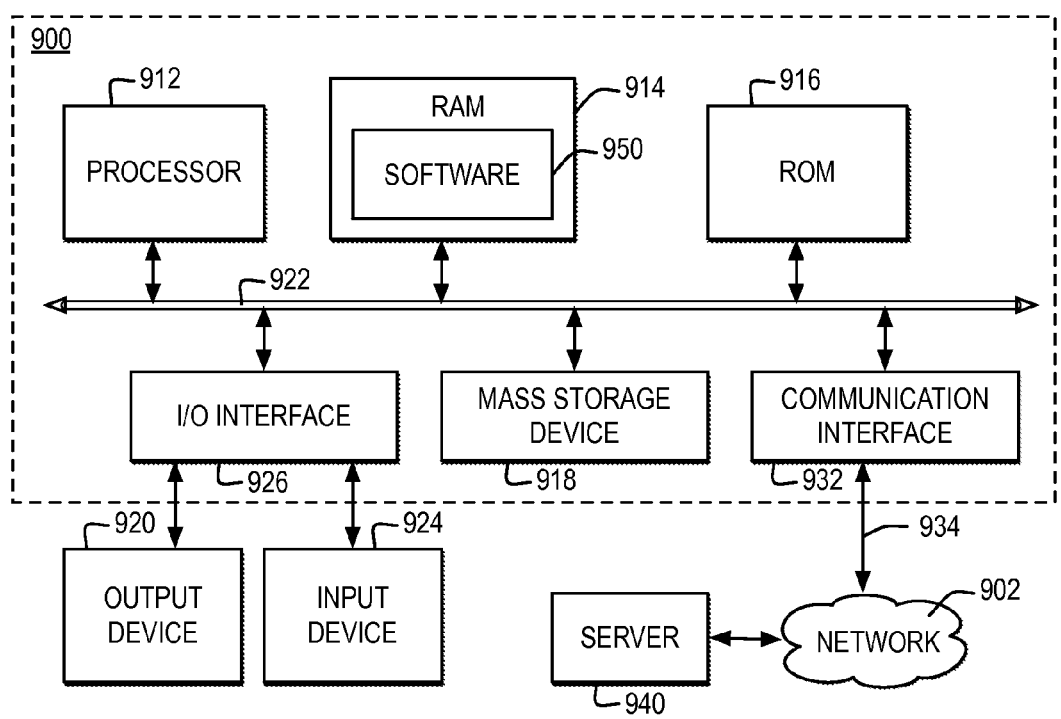
FIG. 9 illustrates a block diagram of one example of a computer system in which one embodiment of the invention may be implemented.

FIG. 9 illustrates a block diagram of one example of a computer system in which one embodiment of the invention may be implemented. The present invention may be performed in a variety of systems and combinations of systems, made up of functional components, such as the functional components described with reference to a computer system 900 and may be communicatively connected to a network, such as network 902.

Computer system 900 includes a bus 922 or other communication device for communicating information within computer system 900, and at least one hardware processing device, such as processor 912, coupled to bus 922 for processing information. Bus 922 preferably includes low-latency and higher latency paths that are connected by bridges and adapters and controlled within computer system 900 by multiple bus controllers. When implemented as a server or node, computer system 900 may include multiple processors designed to improve network servicing power. Where multiple processors share bus 922, additional controllers (not depicted) for managing bus access and locks may be implemented.

Processor 912 may be at least one general-purpose processor such as IBM® PowerPC® processor that, during normal operation, processes data under the control of software 950, which may include at least one of application software, an operating system, middleware, and other code and computer executable programs accessible from a dynamic storage device such as random access memory (RAM) 914, a static storage device such as Read Only Memory (ROM) 916, a data storage device, such as mass storage device 918, or other data storage medium. Software 950 may include, but is not limited to, code, applications, protocols, interfaces, and processes for controlling one or more systems within a network including, but not limited to, an adapter, a switch, a server, a cluster system, and a grid environment.

In one embodiment, the operations performed by processor 912 may control the operations of flowchart of FIGS. 11, 12A, 12B, 13, and 14 and other operations described herein. Operations performed by processor 912 may be requested by software 950 or other code or the steps of one embodiment of the invention might be performed by specific hardware components that contain hardwired logic for performing the steps, or by any combination of programmed computer components and custom hardware components. In one embodiment, one or more components of computer system 100, including but not limited to processor 912, RAM 914, ROM 916, bus 922, and communication interface 932, or other components which may be integrated into one or more components of computer system 100, including, but not limited to, a memory core controller 920 as illustrated in FIG. 9, may contain hardwired logic for implementing out-of-order controller 112, receiving interface 104, queue interface 110, and processing interface 114 and for performing the operations of flowcharts FIGS. 11, 12A, 12B, 13, and 14.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, microcode, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 918, a random access memory (RAM), such as RAM 914, a read-only memory (ROM) 916, an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, such as computer system 900, partly on the user's computer, as a stand-alone software package, partly on the user's computer and partly on a remote computer or entirely on the remote computer or server, such as server 940. In the latter scenario, the remote computer may be connected to the user's computer through any type of network, such as network 902, through a communication interface, such as network interface 932, over a network link that may be connected, for example, to network 902.

In the example, network interface 932 includes an adapter 934 for connecting computer system 900 to network 902 through a link and for communicatively connecting computer system 900 to server 940 or other computing systems via network 902. Although not depicted, network interface 932 may include additional software, such as device drivers, additional hardware and other controllers that enable communication. When implemented as a server, computer system 900 may include multiple communication interfaces accessible via multiple peripheral component interconnect (PCI) bus bridges connected to an input/output controller, for example. In this manner, computer system 900 allows connections to multiple clients via multiple separate ports and each port may also support multiple connections to multiple clients.

One embodiment of the invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 900, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 900, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 932, the network link to network 902, and network 902 may use electrical, electromagnetic, or optical signals that carry digital data streams. The signals through the various networks and the signals on network 902, the network link to network 902, and network interface 932 which carry the digital data to and from computer system 900, may be forms of carrier waves transporting the information.

In addition, computer system 900 may include multiple peripheral components that facilitate input and output. These peripheral components are connected to multiple controllers, adapters, and expansion slots, such as input/output (I/O) interface 926, coupled to one of the multiple levels of bus 922. For example, input device 924 may include, for example, a microphone, a video capture device, an image scanning system, a keyboard, a mouse, or other input peripheral device, communicatively enabled on bus 922 via I/O interface 926 controlling inputs. In addition, for example, output device 920 communicatively enabled on bus 922 via I/O interface 926 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 9 may vary. Furthermore, those of ordinary skill in the art will appreciate that the depicted example is not meant to imply architectural limitations with respect to the present invention.

Figure 10:
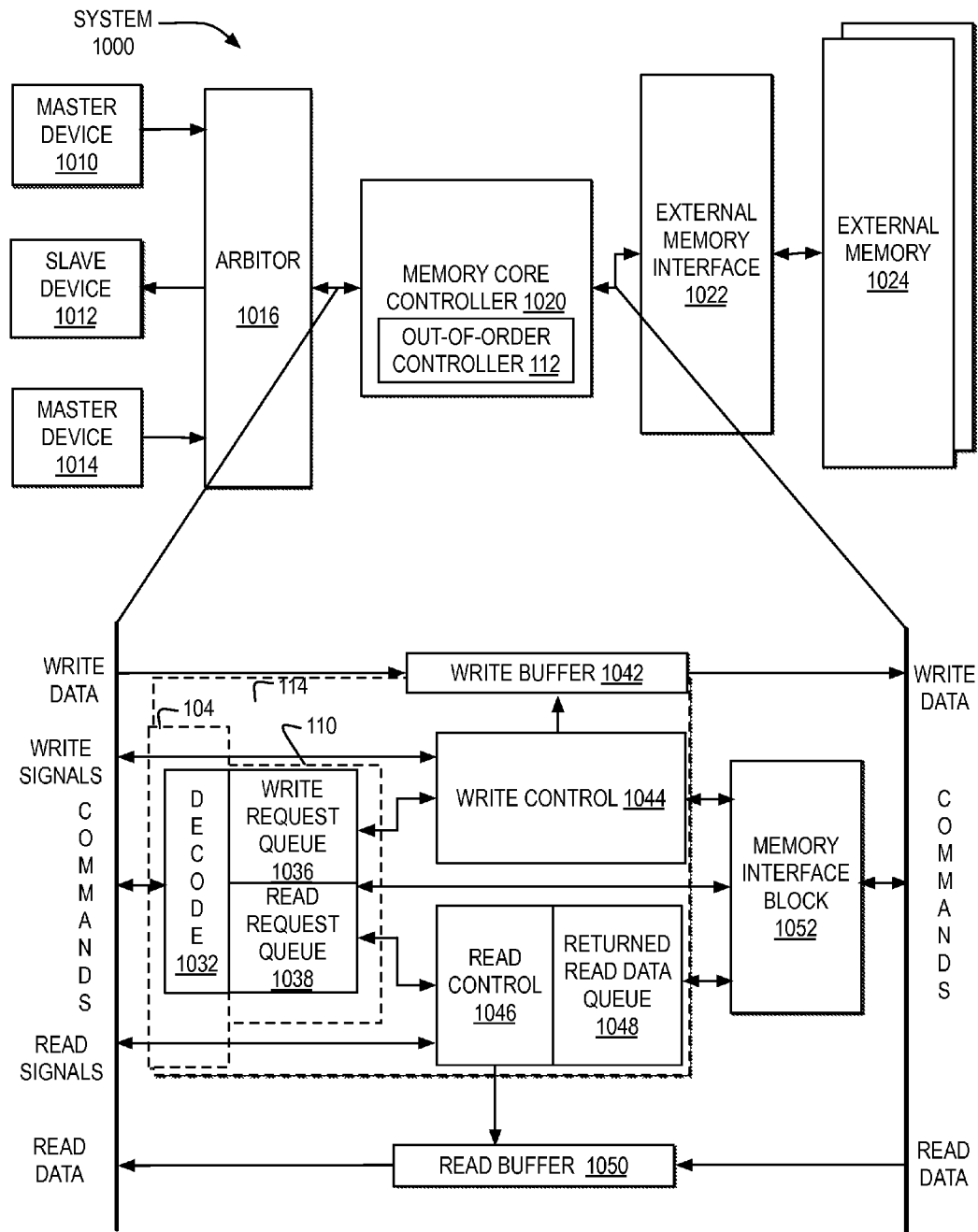
FIG. 10 illustrates a block diagram of one example of a memory core controller including a multiple queue interface in which out-of-order memory command execution from multiple queues is managed while maintaining data coherency.

FIG. 10 is one example of a block diagram of a memory core controller including a multiple queue interface in which out-of-order memory command execution from multiple queues is managed while maintaining data coherency.

In the example, a system 1000 includes a memory core controller 1020 that provides a mechanism to attach and interface one or more devices, such as a master device 1010, a slave device 1012, and a master device 1014 to one or more external memory chips 1024. In one example, master device 1010, slave device 1012, and master device 1014 may include one or more of a processor local bus (PLB) master, PLB slave, a direct memory access (DMA) master, DMA slave, and an I/O master. In the example, an arbiter 1016 interfaces with master device 1010, slave device 1012, and master device 1014 and manages communications between each of the devices and memory core controller 1020. In the example, the communications between each of the devices and memory core controller 1020 may include write event requests, with a write command and write data, and read event requests, with a read command and read data. In the example, an external memory interface 1022 interfaces between memory core controller 1020 and one or more external memory chips 1024. In one example, external memory interface 1022 represents one or more double data rate (DDR), DDR2, and DDR3 synchronous dynamic random-access memory (SDRAM) interfaces and external memory chips 1024 represents one or more DDR SDRAM, DDR2 SDRAM, and DDR3 SDRAM memories. External memory interface 1022 may include drivers and receivers and may interface with a clock buffer between external memory interface 1022 and external memory chips 1024. In additional or alternate examples, external memory interface 1022 may represent one or more interfaces for one or more additional or alternate types of memories and external memory 1024 may represent one or more additional or alternate types of memories.

In the example, memory core controller 1020 may provide a bridge between master device 1010, slave device 1012, and master device 1014 and external memory chips 1024 by managing read events requesting data from external memory 1024 and write events requesting data be written to external memory 1024. In one example, receiving interface 104 includes a decoder 1032 for receiving commands from arbiter 1016, identifying whether each command is a read command or a write command, and placing identified read commands in read request queue 1038 and identified write commands in a write request queue 1036, where queue interface 110 includes read request queue 1038 and write request queue 1036. In the example, processing interface 114 includes a write buffer 1042 for buffering write data from arbiter 1016, a read buffer 1050 for buffering read data to be read by arbiter 1016, a write control 1044 for performing write control logic for arbiter 1016, a read control 1046 for performing read control logic for arbiter 1016, a returned read data queue 1048 for tracking returned read data from external memory interface 1022, and a memory interface block 1052 for interfacing with external memory interface 1022.

In the example, memory core controller 1020 includes out-of-order controller 112, as logic distributed throughout the components of memory core controller 1020 for controlling the placement of commands received from arbiter 1016 into read request queue 1038 and write request queue 1036 and for controlling the selection of commands to be processed next by external memory interface 1022 from read request queue 1038 and write request queue 1038. In one example, the command to be processed next from read request queue and write request queue 1038 is selected and passed to memory interface block 1052 for processing by external memory interface 1022.

Figure 11:
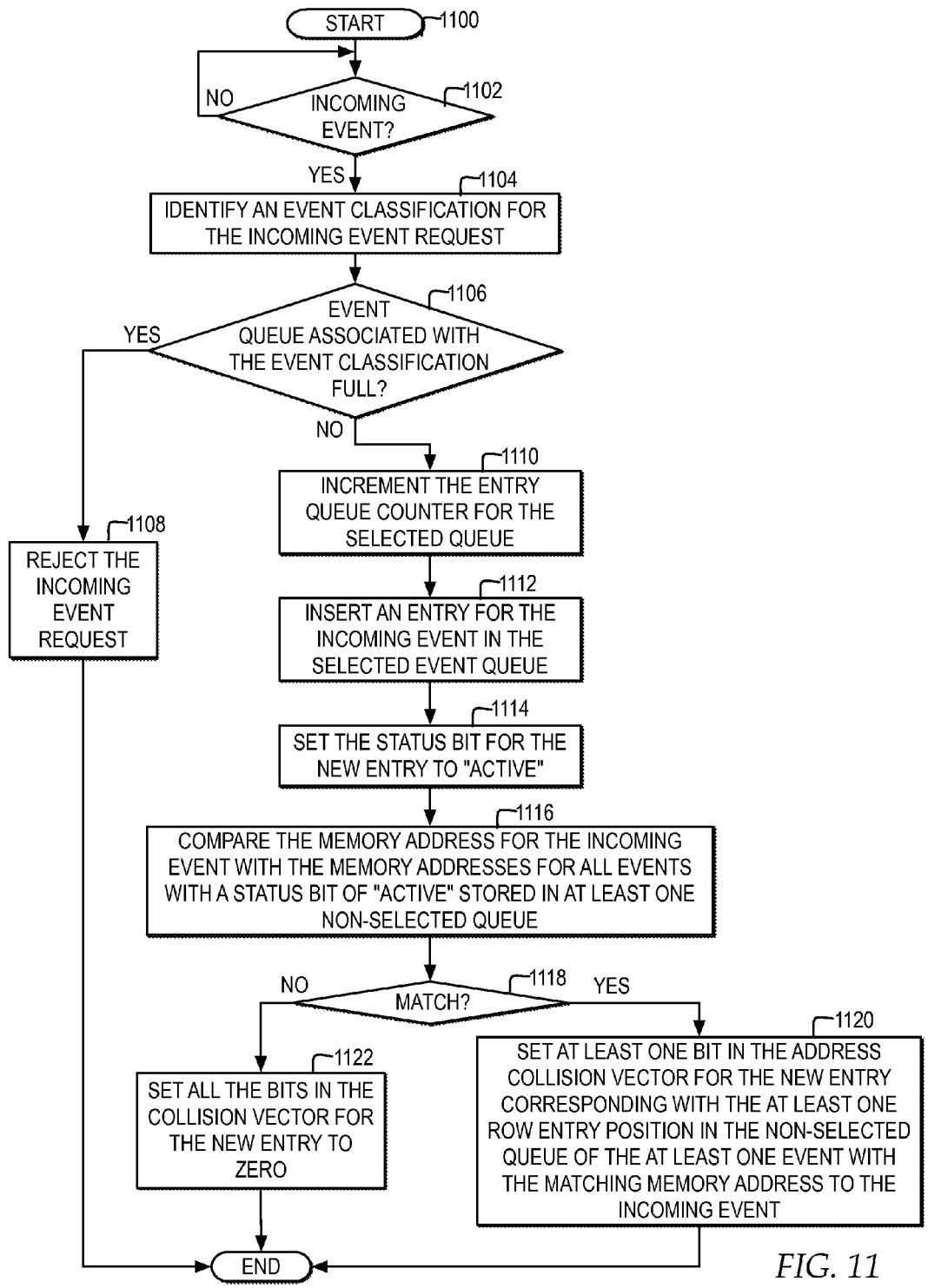
FIG. 11 illustrates a high level logic flowchart of a process and program for managing placement of incoming events in one of multiple event queues and for managing setting bits in one or more collision arrays in a queue interface in which out-of-order memory command execution from multiple queues is managed while maintaining data coherency.

FIG. 11 illustrates a high level logic flowchart of a process and program for managing placement of incoming events in one of multiple event queues and for managing setting bits in one or more collision arrays in a queue interface in which out-of-order memory command execution from multiple queues is managed while maintaining data coherency. In the example, the process starts at block 1100 and thereafter proceeds to block 1102. Block 1102 illustrates a determination whether an incoming event request is detected. At block 1102, if an incoming event request is detected, then the process passes to block 1104. Block 1104 illustrates identifying an event classification for the incoming event request. Next, block 1106 illustrates a determination of whether the event queue associated with the event classification is full. At block 1106, if the event queue associated with the event classification is full, then the process passes to block 1108. Block 1108 illustrates rejecting the incoming event request, and the process ends.

Returning to block 1106, at block 1106, if the event queue associated with the event classification is not full, then the process passes to block 1110. Block 1110 illustrates incrementing the entry queue counter for the selected queue. Thereafter, block 1112 illustrates inserting an entry for the event request in the selected event queue. Next, block 1114 illustrates setting the status bit for the new entry to "active". Thereafter, block 1116 illustrates comparing the memory address for the incoming event with the memory addresses for all events with a status bit of "active" stored in at least one non-selected queue from among the multiple queues. Next, block 1118 illustrates a determination whether there is a match between the memory address for the incoming event and any of the memory address for events with a status bit of "active" stored in at least one non-selected queue from among multiple queues. At block 1118, if there is not a match, then the process passes to block 1022. Block 1022 illustrates setting the bits in the collision vector for the new entry to zero, and the process ends. At block 1118, if there is a match, then the process passes to block 1120. Block 1120 illustrates setting at least one bit in the collision vector of the collision array for the new entry in the column corresponding with the at least one row entry position in the non-selected queue of the at least one event with the matching memory address to the incoming event, and the process ends.

Figure 12A:
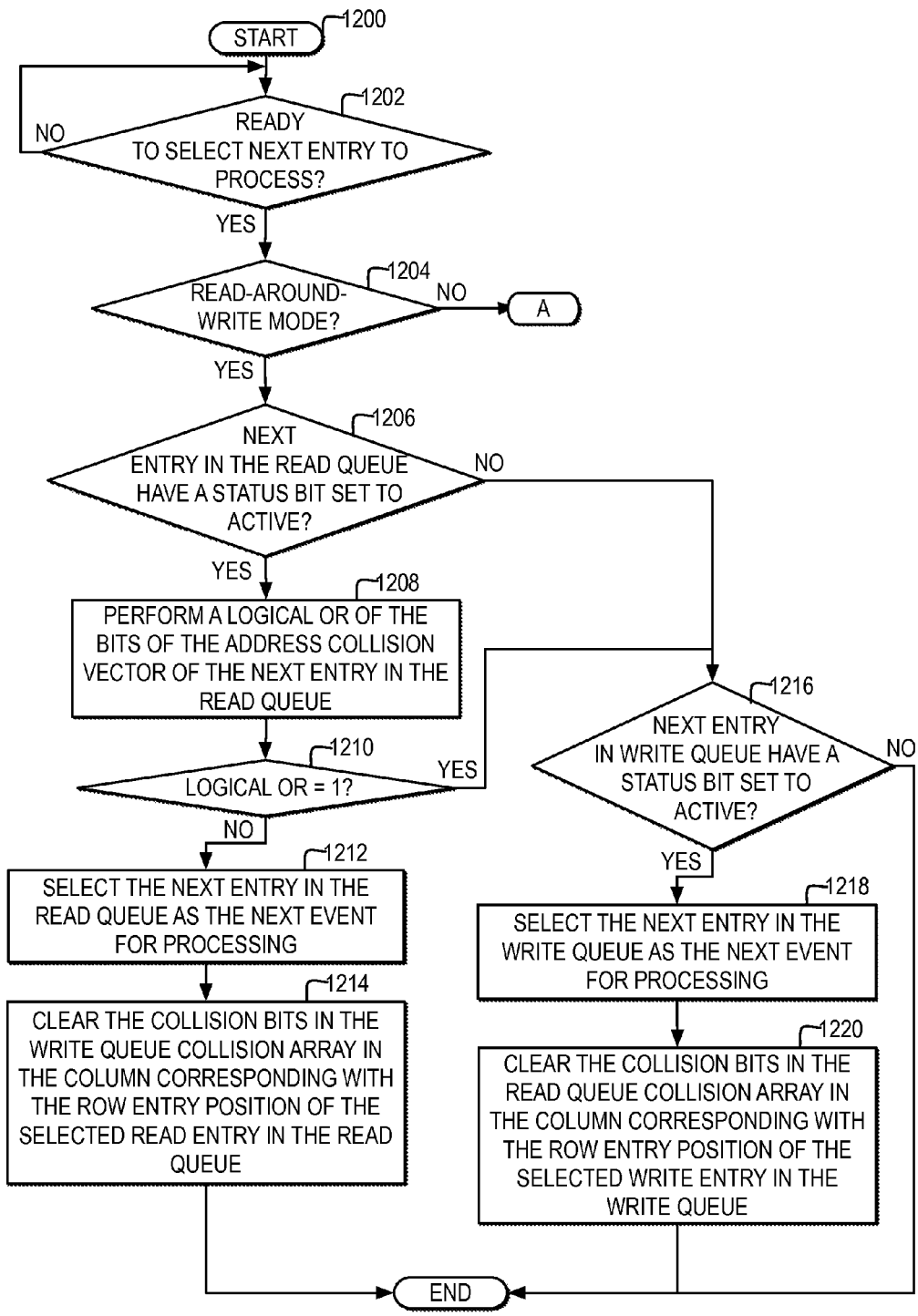
FIGS. 12A and 12b illustrate a high level logic flowchart of a process and program for managing selection of a next event to process in a queue interface in which out-of-order memory command execution from multiple queues is managed while maintaining data coherency.
Figure 12B:
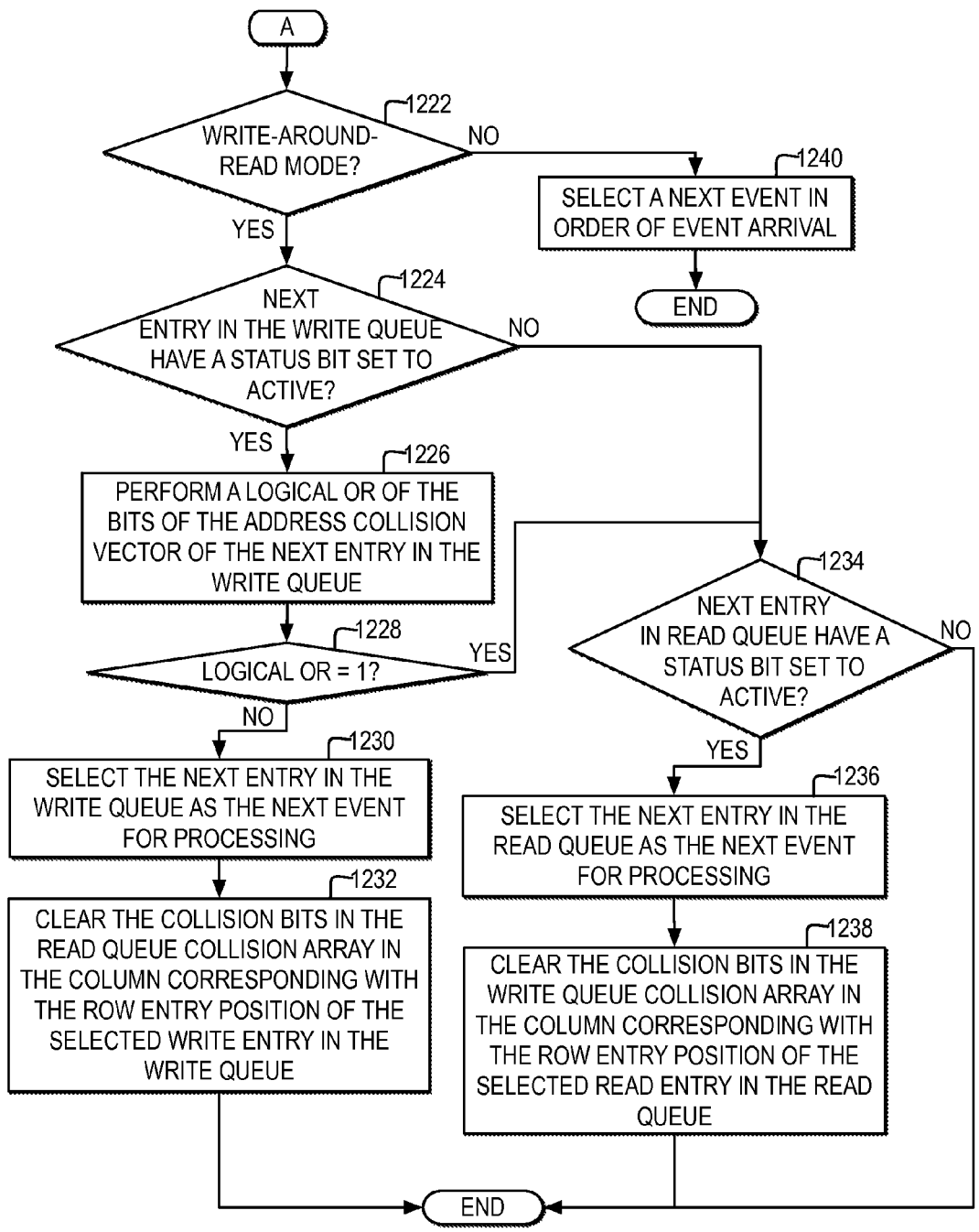

FIGS. 12A-12B illustrate a high level logic flowchart of a process and program for managing selection of a next event to process in a queue interface in which out-of-order memory command execution from multiple queues is managed while maintaining data coherency. In the example, the process starts at block 1200 and thereafter proceeds to block 1202. Block 1202 illustrates a determination whether the out-of-order controller is ready to select the next entry to process. At block 1202, if the out-of-order controller is ready to select the next entry to process, then the process passes to block 1204. Block 1204 illustrates a determination whether the out-of-order controller is operating in read-around-write mode. At block 1204, if the out-of-order controller is operating in read-around-write mode, then the process passes to block 1206.

Block 1206 illustrates a determination whether the next entry in the read queue has a status bit set to "active". At block 1206, if the next entry in the read queue has a status bit set to "active", then the process passes to block 1208. Block 1208 illustrates performing a logical OR operation on the bits of the address collision vector of the next entry in the read queue. Next, block 1210 illustrates a determination whether the logical OR operation equals "1". At block 1210, if the OR operation equals "1", then the process passes to block 1216. At block 1210, if the logical OR operation does not equal "1", then the process passes to block 1212. Block 1212 illustrates selecting the next entry in the read queue as the next event for processing. Next, block 1214 illustrates clearing the collision bits in the write queue collision array in the column corresponding with the row entry position of the selected read entry in the read queue, and the process ends.

Returning to block 1206, if the next entry in the read queue does not have a status bit set to "active", then the process passes to block 1216. Block 1216 illustrates a determination whether the next entry in the write queue has a status bit set to "active". At block 1216, if the next entry in the write queue does not have a status bit set to "active", then the process ends. At block 1216, if the next entry in the write queue does have a status bit set to "active", then the process passes to block 1218. Block 1218 illustrates selecting the next entry in the write queue as the next event for processing. Next, block 1220 illustrates clearing the collision bits in the read queue collision array in the column corresponding with the row entry position of the selected write entry in the write queue, and the process ends.

Returning to block 1204, at block 1204, if the out-of-order controller is not operating in write-around-read mode, then the process passes to block 1240. Block 1240 illustrates selecting a next event in order of arrival of events, and the process ends. Returning to block 1222, block 1222 if the out-of-order controller is operating in write-around-read mode, then the process passes to block 1224. Block 1224 illustrates a determination whether the next entry in the write queue has a status bit set to "active". At block 1224, if the next entry in the write queue has a status bit set to "active", then the process passes to block 1226. Block 1226 illustrates performing a logical OR operation on the bits of the address collision vector of the next entry in the write queue. Next, block 1228 illustrates a determination whether the logical OR operation equals "1". At block 1228, if the logical OR operation equals "1", then the process passes to block 1234. At block 1228, if the logical OR operation does not equal "1", then the process passes to block 1230. Block 1230 illustrates selecting the next entry in the write queue as the next event for processing. Next, block 1232 illustrates clearing the collision bits in the read queue collision array in the column corresponding with the row entry position of the selected write entry in the write queue, and the process ends.

Returning to block 1224, if the next entry in the write queue does not have a status bit set to "active", then the process passes to block 1234. Block 1234 illustrates a determination whether the next entry in the read queue has a status bit set to "active". At block 1234, if the next entry in the read queue does not have a status bit set to "active", then the process ends. At block 1234, if the next entry in the read queue does have a status bit set to "active", then the process passes to block 1236. Block 1236 illustrates selecting the next entry in the read queue as the next event for processing. Next, block 1238 illustrates clearing the collision bits in the write queue collision array in the column corresponding with the row entry position of the selected read entry in the read queue, and the process ends.

Figures 13, 14:
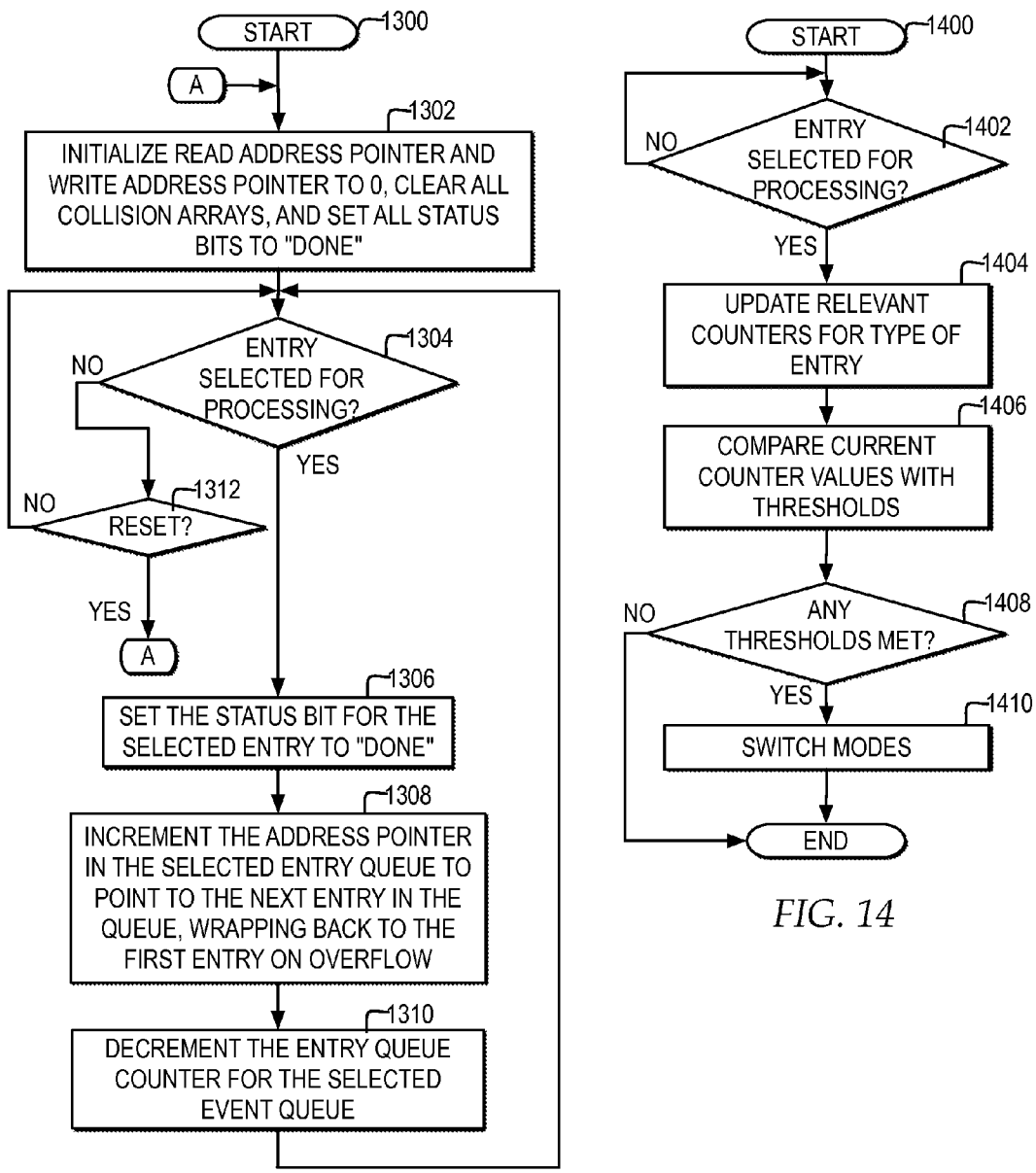
FIG. 13 illustrates a high level logic flowchart of a process and program for managing next entry pointers and queue counters in a queue interface in which out-of-order memory command execution from multiple queues is managed while maintaining data coherency.
FIG. 14 illustrates a high level logic flowchart of a process and program for managing selection of a current mode for operation of an out-of-order controller from among read-around-write mode and write-around-read mode.

FIG. 13 illustrates a high level logic flowchart of a process and program for managing next entry pointers and queue counters in a queue interface in which out-of-order memory command execution from multiple queues is managed while maintaining data coherency. In the example, the process starts at block 1300 and thereafter proceeds to block 1302. Block 1302 illustrates initializing the read address pointer pointing to a next entry in a read queue and the write address pointer pointing to a next entry in a write queue to "0", clearing all the collision array bits, and setting the status bit for all entries in all queues to "done", or "0". Next, block 1304 illustrates a determination whether an entry is selected for processing from among entries in multiple queues.

At block 1304, if an entry is not selected for processing, then the process passes to block 1312. Block 1312 illustrates a determination whether a reset input is received. If a reset input is not received, then the process returns to block 1304. At block 1304, if an entry is selected for processing, then the process passes to block 1306. Block 1306 illustrates setting the status bit for the selected entry to "done". Next, block 1308 illustrates incrementing the address pointer in the selected entry queue to point to the next entry in the queue, wrapping back to the first entry on overflow. Thereafter, block 1310 illustrates decrementing the entry queue counter for the selected event queue, and the process returns to block 1304.

FIG. 14 illustrates a high level logic flowchart of a process and program for managing selection of a current mode for operation of an out-of-order controller from among read-around-write mode and write-around-read mode. In the example, the process starts at block 1400 and thereafter proceeds to block 1402. Block 1402 illustrates a determination whether an entry has been selected for processing. If an entry is selected for processing, then the process passes to block 1404. Block 1404 illustrates updating the relevant counters for the type of entry. For example, a counter may be specified that counts the number of consecutively selected read events, resetting if a write event is selected. Block 1406 illustrates comparing the current counter values with thresholds, such as thresholds 234. In one example, an entry queue counter may be compared against a threshold for a maximum number of entries. In another example, a counter that counts the number of consecutively selected read events may be compared against a threshold for a maximum number of read consecutive events. Thereafter, block 1408 illustrates a determination whether any of the thresholds are met. At block 1408, if none of the thresholds are met, then the process ends. At block 1408, if any of the thresholds are met, then the process passes to block 1410. Block 1410 illustrates switching modes, either from read-around write mode to write-around-read mode or from write-around-read mode to read-around-write mode, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method for tracking memory address collisions, comprising:
    detecting, by a memory core controller operative in a memory comprising at least two queues, a match of an incoming address of an incoming event for placement in a first queue of the at least two queues with a queued address of an active entry for an event already placed in a second queue of the at least two queues; and
    responsive to detecting the match, setting, by the memory core controller, a particular bit in a collision vector for the event entry for the incoming event in a bit position from among the plurality of bits corresponding with a row entry position of the active entry in the second queue to indicate the active entry is older, to track the relative arrival order of events that access a same address in each of the at least two queues.

2. The method according to claim 1, further comprising:
responsive to the memory core controller being ready to select a next entry to process while the memory core controller is operating in a mode where the first queue is given priority over the second queue and the incoming entry placed in the first queue is an oldest entry next in the particular queue, performing, by the memory core controller, a first logical OR operation on the plurality of bits in the collision vector;
responsive to the first logical OR operation returning a zero, selecting, by the memory core controller, the incoming entry as the next entry to process;
responsive to the first logical OR operation returning a one, selecting, by the memory core controller, an oldest entry in the second queue as the next entry to process and clearing a selected bit from among the least one particular bit in a particular position of the at least one bit position corresponding with a particular row position of the oldest entry within the plurality of other entries.

3. The method according to claim 2, further comprising:
responsive to selecting the incoming entry as the next entry to process, clearing, by the memory core controller, another bit position corresponding with at least one additional row entry position of the incoming entry within a plurality of entries in each of a plurality of other collision vectors for the plurality of entries in the second queue each comprising a number of a plurality of other bits corresponding to a number of a plurality of entries in the first queue.

4. The method according to claim 1, further comprising:
responsive to the memory core controller selecting the incoming event queued in the first queue for processing, clearing the bit position in each separate collision vector for each entry in the particular queue; and
only selecting, by the memory core controller, the incoming event as a next event for processing after the bit position is cleared in the collision vector.

5. The method according to claim 1, further comprising:
responsive to the memory core controller placing the incoming event in the first queue, incrementing an entry queue counter for the first queue;
responsive to the memory core controller selecting the event entry for processing, decrementing the entry queue counter for the first queue;
responsive to the entry queue counter reaching a threshold value while the memory core controller is operating in a first mode prioritizing the second queue over the first queue, automatically shifting to a second mode prioritizing the first queue over the second queue and selecting each oldest entry in the second queue for processing next unless the separate collision vector for each oldest entry of the second queue comprises at least one set bit; and
responsive to the entry queue counter decrementing below a second threshold value while in the second mode, automatically shifting to the first mode.

6. The method according to claim 1, further comprising:
marking a separate status bit for each separate entry from among a plurality of entries in the first queue and a plurality of other entries in a second queue as ready to be selected for processing when a new incoming event is placed in each entry and as done when the event in the separate entry is selected for processing.

7. A system for tracking memory address collisions, comprising
a memory core controller operative in a memory comprising at least two queues, to detect a match of an incoming address of an incoming event for placement in a first queue of the at least two queues with a queued address of an active entry for an event already placed in a second queue of the at least two queues; and
the memory core controller operative, responsive to detecting the match, to set a particular bit in a collision vector for the event entry for the incoming event in a bit position from among the plurality of bits corresponding with a row entry position of the active entry in the second queue to indicate the active entry is older, to track the relative arrival order of events that access a same address in each of the at least two queues.

8. The system according to claim 7, further comprising:
the memory core controller operative, responsive to being ready to select a next entry to process while the memory core controller is operating in a mode where the first queue is given priority over the second queue and the incoming entry placed in the first queue is an oldest entry next in the particular queue, to perform a first logical OR operation on the plurality of bits in the collision vector;
the memory core controller operative, responsive to the first logical OR operation returning a zero, to select the incoming entry as the next entry to process; and
the memory core controller operative, responsive to the first logical OR operation returning a one, to select an oldest entry in the second queue as the next entry to process and clearing a selected bit from among the least one particular bit in a particular position of the at least one bit position corresponding with a particular row position of the oldest entry within the plurality of other entries.

9. The system according to claim 8, further comprising:
the memory core controller operative, responsive to selecting the incoming entry as the next entry to process, to clear another bit position corresponding with at least one additional row entry position of the incoming entry within a plurality of entries in each of a plurality of other collision vectors for the plurality of entries in the second queue each comprising a number of a plurality of other bits corresponding to a number of a plurality of entries in the first queue.

10. The system according to claim 7, further comprising:
the memory core controller operative, responsive to selecting the incoming event queued in the first queue for processing, to clear the bit position in each separate collision vector for each entry in the particular queue; and
the memory core controller operative to only select the incoming event as a next event for processing after the bit position is cleared in the collision vector.

11. The system according to claim 7, further comprising:
the memory core controller operative, responsive to the memory core controller placing the incoming event in the first queue, to increment an entry queue counter for the first queue;
the memory core controller operative, responsive to the memory core controller selecting the event entry for processing, to decrement the entry queue counter for the first queue;
the memory core controller operative, responsive to the entry queue counter reaching a threshold value while the memory core controller is operating in a first mode prioritizing the second queue over the first queue, to automatically shift to a second mode prioritizing the first queue over the second queue and selecting each oldest entry in the second queue for processing next unless the separate collision vector for each oldest entry of the second queue comprises at least one set bit; and the memory core controller operative, responsive to the entry queue counter decrementing below a second threshold value while in the second mode, to automatically shift to the first mode.

12. The system according to claim 7, further comprising:
the memory core controller operative to mark a separate status bit for each separate entry from among a plurality of entries in the first queue and a plurality of other entries in a second queue as ready to be selected for processing when a new incoming event is placed in each entry and as done when the event in the separate entry is selected for processing.

13. A system for managing queues in a memory, comprising:
the memory core controller operative, in a mode where a particular queue from among at least two queues is given priority over the at least one other queue;
the memory core controller, responsive to being ready to select a next entry from among the at least two queues to process, for a particular entry in the particular queue being the oldest entry next in the particular queue, operative to perform a first logical OR operations on a plurality of bits of a particular collision vector of the particular entry, wherein the particular collision vector may comprise a number of a plurality of bits corresponding to a number of a plurality of other entries in the at least one other queue, wherein if the particular entry accesses a same address as at least one another event in the at least one other queue and the at least one another event arrived before the particular entry, at least one particular bit of the plurality of bits of the particular collision vector is already set; and
the memory core controller, responsive to the first logical OR operation returning a one, operative to select an oldest entry in the at least one other queue as the next entry to process and clearing a selected bit from among the least one particular bit in a particular position of the at least one bit position corresponding with a particular row position of the oldest entry within the plurality of other entries.

14. The system according to claim 13, further comprising:
the memory core controller, responsive to the first logical OR operation returning a zero, operative to select an oldest entry in the particular queue as the next entry to process.

\* \* \* \* \*